(12) United States Patent
Liu et al.

(10) Patent No.: US 12,028,758 B2
(45) Date of Patent: Jul. 2, 2024

(54) METHOD AND DEVICE IN NODES USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 386 days.

(21) Appl. No.: 17/557,062

(22) Filed: Dec. 21, 2021

(65) Prior Publication Data

US 2022/0201562 A1 Jun. 23, 2022

(30) Foreign Application Priority Data

Dec. 23, 2020 (CN) .......................... 202011538066.8

(51) Int. Cl.
*H04L 1/1812* (2023.01)
*H04L 1/1607* (2023.01)
*H04L 5/00* (2006.01)
*H04W 36/00* (2009.01)
*H04W 72/23* (2023.01)

(52) U.S. Cl.
CPC ....... *H04W 36/0061* (2013.01); *H04L 1/1614* (2013.01); *H04L 1/1812* (2013.01); *H04L 5/0055* (2013.01); *H04W 72/23* (2023.01)

(58) Field of Classification Search
CPC ... H04L 1/1614; H04L 1/1664; H04L 1/1812; H04L 5/0053; H04L 5/0055; H04W 72/23
See application file for complete search history.

(56) References Cited

U.S. PATENT DOCUMENTS

| | | | |
|---|---|---|---|
| 2019/0159221 A1* | 5/2019 | Zhang | H04L 5/0037 |
| 2021/0014832 A1* | 1/2021 | Liu | H04W 72/0453 |
| 2021/0274524 A1* | 9/2021 | Liu | H04L 1/0041 |
| 2022/0166574 A1* | 5/2022 | Liu | H04L 1/0008 |
| 2023/0224898 A1* | 7/2023 | Ling | H04L 5/0055 |
| | | | 370/329 |
| 2023/0276460 A1* | 8/2023 | Liu | H04L 5/0053 |
| | | | 370/329 |
| 2023/0291504 A1* | 9/2023 | Cheng | H04W 76/20 |
| 2023/0319847 A1* | 10/2023 | Liu | H04L 1/18 |
| | | | 370/329 |
| 2023/0413271 A1* | 12/2023 | Jiang | H04L 27/261 |

* cited by examiner

*Primary Examiner* — Gary Mu

(57) ABSTRACT

The present disclosure provides a method and device in a node used for wireless communications. A node receives a first information block, receives a first PDCCH, the first PDCCH belongs to a first search space set; transmits W bit sets, the first information block is used to determine the W bit sets; the first search space set is associated with a first control resource set, the first control resource set belongs to a first control resource pool; the first control resource pool is used to determine a first bit set out of the W bit sets, the first bit set comprises X bit subsets; the X bit subsets are respectively for X cell groups, and the first PDCCH is used for a first serving cell; the first PDCCH is used to determine a first identifier. The present disclosure guarantees the successful transmission of HARQ.

20 Claims, 5 Drawing Sheets

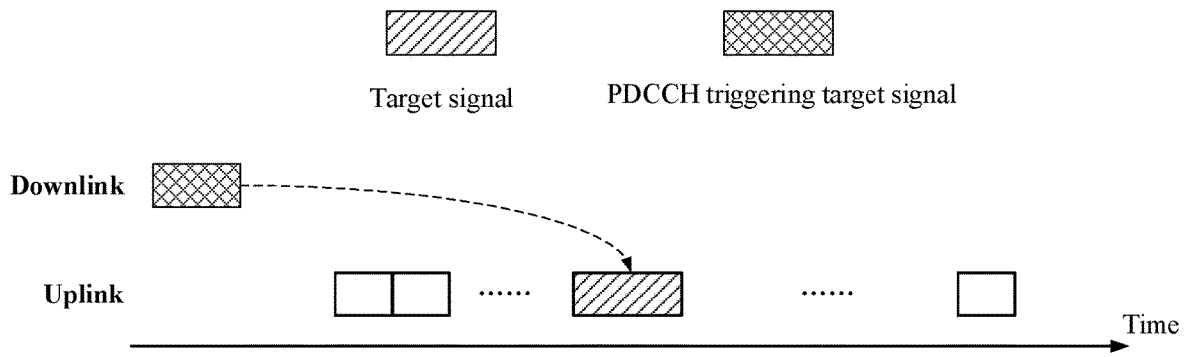
FIG. 6
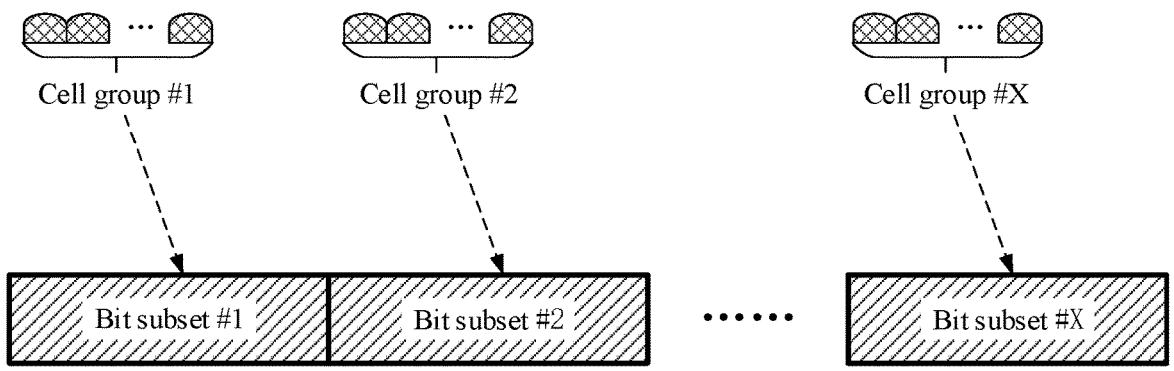
FIG. 7
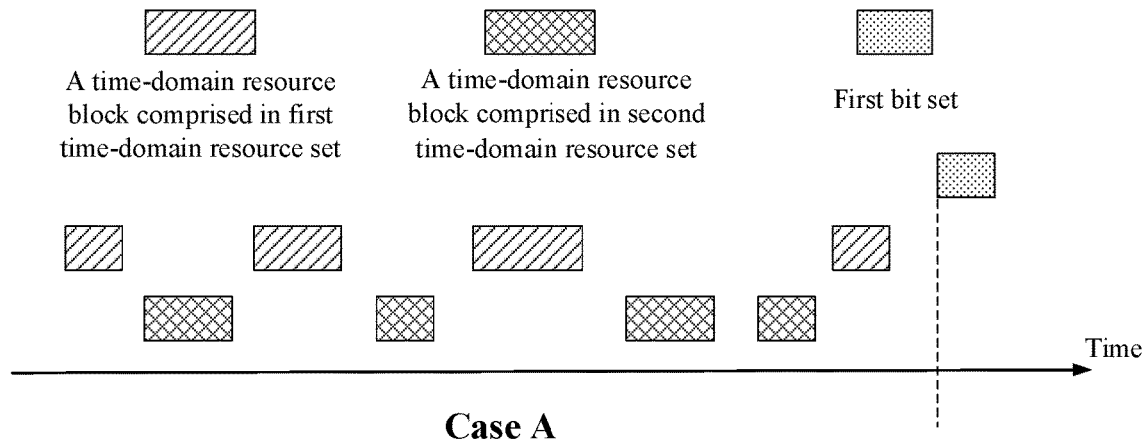
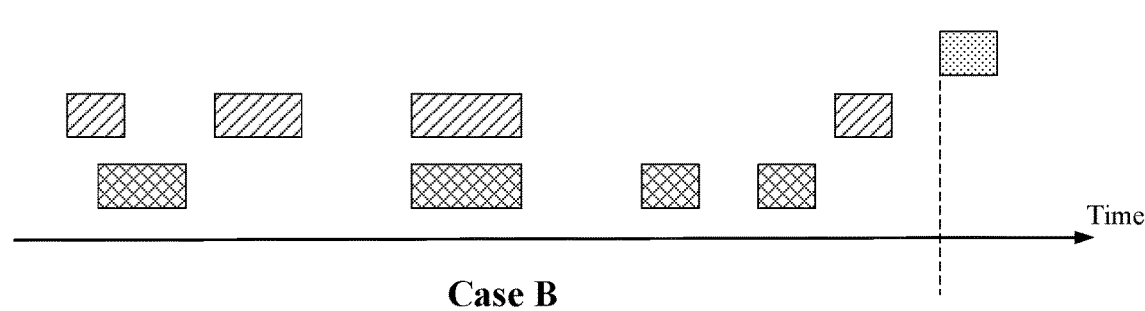
FIG. 8

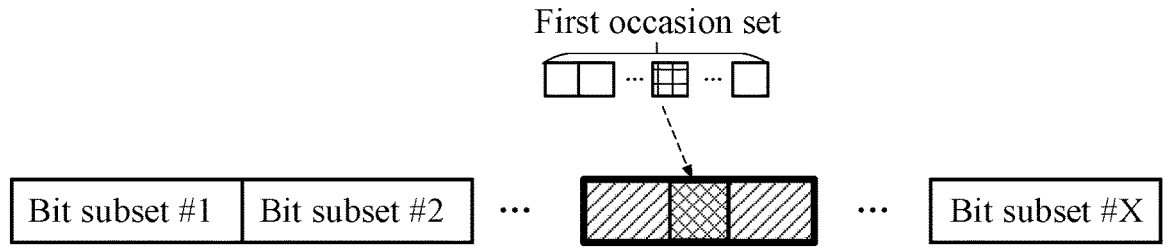

FIG. 9

| Index | Occasion set #1 | | | Occasion set #2 | | |
|---|---|---|---|---|---|---|
| | Slot offset | Start symbol | Number of symbols | Slot offset | Start symbol | Number of symbols |
| 1 | $d_1(1)$ | $S_1(1)$ | $L_1(1)$ | $d_2(1)$ | $S_2(1)$ | $L_2(1)$ |
| 2 | $d_1(2)$ | $S_1(2)$ | $L_1(2)$ | $d_2(2)$ | $S_2(2)$ | $L_2(2)$ |
| 3 | $d_1(3)$ | $S_1(3)$ | $L_1(3)$ | $d_2(3)$ | $S_2(3)$ | $L_2(3)$ |
| 4 | $d_1(4)$ | $S_1(4)$ | $L_1(4)$ | $d_2(4)$ | $S_2(4)$ | $L_2(4)$ |
| 5 | $d_1(5)$ | $S_1(5)$ | $L_1(5)$ | $d_2(5)$ | $S_2(5)$ | $L_2(5)$ |
| 6 | $d_1(6)$ | $S_1(6)$ | $L_1(6)$ | $d_2(6)$ | $S_2(6)$ | $L_2(6)$ |
| 7 | $d_1(7)$ | $S_1(7)$ | $L_1(7)$ | $d_2(7)$ | $S_2(7)$ | $L_2(7)$ |
| 8 | $d_1(8)$ | $S_1(8)$ | $L_1(8)$ | $d_2(8)$ | $S_2(8)$ | $L_2(8)$ |
| 9 | $d_1(9)$ | $S_1(9)$ | $L_1(9)$ | $d_2(9)$ | $S_2(9)$ | $L_2(9)$ |
| 10 | $d_1(10)$ | $S_1(10)$ | $L_1(10)$ | $d_2(10)$ | $S_2(10)$ | $L_2(10)$ |
| 11 | $d_1(11)$ | $S_1(11)$ | $L_1(11)$ | $d_2(11)$ | $S_2(11)$ | $L_2(11)$ |
| 12 | $d_1(12)$ | $S_1(12)$ | $L_1(12)$ | $d_2(12)$ | $S_2(12)$ | $L_2(12)$ |
| 13 | $d_1(13)$ | $S_1(13)$ | $L_1(13)$ | $d_2(13)$ | $S_2(13)$ | $L_2(13)$ |
| 14 | $d_1(14)$ | $S_1(14)$ | $L_1(14)$ | $d_2(14)$ | $S_2(14)$ | $L_2(14)$ |
| 15 | $d_1(15)$ | $S_1(15)$ | $L_1(15)$ | $d_2(15)$ | $S_2(15)$ | $L_2(15)$ |
| 16 | $d_1(16)$ | $S_1(16)$ | $L_1(16)$ | $d_2(16)$ | $S_2(16)$ | $L_2(16)$ |

FIG. 10

METHOD AND DEVICE IN NODES USED FOR WIRELESS COMMUNICATION

CROSS REFERENCE TO RELATED APPLICATIONS

This application claims the priority benefit of Chinese Patent Application 202011538066.8, filed on Dec. 23, 2020, the full disclosure of which is incorporated herein by reference.

BACKGROUND

Technical Field

The present disclosure relates to transmission methods and devices in wireless communication systems, and in particular to a transmission scheme and device of groupcast, multicast or broadcast in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. The Work Item (WI) of NR was approved at the 3GPP RAN #75th plenary to standardize NR. It was decided to start a Study Item (SI) and a WI of NR Rel-17 at 3GPP RAN #86 plenary.

Transmission of multicast and broadcast traffic, such as firmware upgrade, videocast, etc., is needed to be supported in a plurality of application scenarios adopting NR technology. In NR Rel-17, in order to support multicast and broadcast traffic, a WI of multicast and broadcast traffic under NR was approved at 3GPP RAN #86 plenary, where relevant standardization work was started.

SUMMARY

HARQ feedback for multicast/broadcast transmission is supported in the WI of multicast and broadcast transmission to improve the robustness of the multicast/broadcast transmission. To address the HARQ feedback problem of the multicast/broadcast transmission, the present disclosure provides a solution. It should be noted that though the present disclosure only took multicast/broadcast transmission for example or as a typical scenario in the statement above; the present disclosure is also applicable to other scenarios confronting similar problems (such as scenarios where multiple traffic coexists, or the scenario where there exist multiple parallel downlink transmissions for a same UE within a serving cell), where similar technical effects can be achieved. Additionally, the adoption of a unified solution for various scenarios, including but not limited to scenarios of multicast/broadcast transmission, contributes to the reduction of hardware complexity and costs. If no conflict is incurred, embodiments in a first node in the present disclosure and the characteristics of the embodiments are also applicable to a second node, and vice versa. Particularly, for interpretations of the terminology, nouns, functions and variants (if not specified) in the present disclosure, refer to definitions given in TS36 series, TS38 series and TS37 series of 3GPP specifications.

The present disclosure provides a method in a first node for wireless communications, comprising:
  receiving a first information block;
  receiving a first PDCCH, a control channel candidate occupied by the first PDCCH belonging to a first search space set; and
  transmitting W bit sets, the first information block being used to determine the W bit sets, each of the W bit sets comprising at least one HARQ-ACK bit, W being a positive integer greater than 1;
  herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

In one embodiment, since a first bit set is determined through a first control resource pool, so when a separate HARQ-ACK codebook is adopted for multiple TRPs, a HARQ-ACK codebook to which HARQ-ACK transmission of groupcast or broadcast traffic belongs is judged according to a TRP to which a PDCCH scheduling groupcast or broadcast traffic belongs, so as to ensure the accurate transmission of HARQ-ACK of groupcast or broadcast traffic.

In one embodiment, when a first serving cell belongs to a plurality of cell groups, a HARQ-ACK for groupcast or multicast transmission is regarded as a virtual cell and a unicast HARQ-ACK of a same TRP are multiplexed to a same HARQ-ACK codebook during a HARQ-ACK feedback for groupcast or broadcast traffic, so as to ensure effective multiplexing with HARQ-ACK of other traffic (such as unicast) without introducing too many HARQ-ACK codebooks, thus improving resource utilization and reducing header overhead.

In one embodiment, a cell group to which a first serving cell belongs is determined according to at least one of a search space set or a first identifier, so that when HARQ-ACK codebooks of a HARQ-ACK comprising groupcast or multicast traffic are constructed, determination of implicit HARQ-ACK codebooks is realized, which ensures an accurate transmission of the HARQ-ACK, thus reducing signaling overhead.

According to one aspect of the present disclosure, the above method is characterized in that the W bit sets are respectively carried by W signals, and time-domain resources occupied by any two of the W signals are orthogonal; the W signals are respectively triggered by PDCCHs comprised in W control resource pools, and indexes of any two of the W control resource pools are unequal; one of the W signals carrying the first bit set is a target signal, and the first control resource pool is one of the W control resource pools comprising a PDCCH triggering the target signal.

According to one aspect of the present disclosure, the above method is characterized in that the X cell groups are indexed in order, and at least one of the first search space set or the first identifier is used to determine an index of a cell group to which the first serving cell belongs; the X bit subsets are concatenated to generate the first bit set, and an order of indexes of the X cell groups is used to determine a concatenation order of the X bit subsets.

According to one aspect of the present disclosure, the above method is characterized in comprising:

receiving a second information block;

herein, the second information block is used to determine a first time-domain resource block, and the first time-domain resource set comprises more than one time-domain resource blocks; the first PDCCH is used to determine a target time-domain resource block, the target time-domain resource block belongs to a second time-domain resource set, and the second time-domain resource set comprises more than one time-domain resource blocks; whether there exist fully or partially overlapped time-domain resource blocks between the first time-domain resource set and the second time-domain resource set is used to determine the X cell groups.

In one embodiment, X cell groups are determined according to whether there exist fully or partially overlapped time-domain resource blocks between a first time-domain resource set and a second time-domain resource set, so as to support a determination method of a sub-codebook of an implicit HARQ-ACK codebook, and header overhead of HARQ-ACK codebooks and overhead for configuring signalings are saved as much as possible when the multiplexing transmission of a HARQ-ACK of groupcast or broadcast traffic and a HARQ-ACK of unicast traffic is ensured.

According to one aspect of the present disclosure, the above method is characterized in that a first bit subset is one of the X bit subsets, the first bit subset comprises a first bit block, the first bit block comprises at least one bit, and any bit comprised in the first bit block belongs to the first bit subset; the first bit block corresponds to a first time-domain occasion, the first time-domain occasion is a time-domain occasion comprised in a first occasion set, the first occasion set comprises at least one time-domain occasion, and a position of the first time-domain occasion in the first occasion set is used to determine the first bit block in the first bit subset.

According to one aspect of the present disclosure, the above method is characterized in that the first occasion set is one of M occasion sets, and any of the M occasion sets comprises at least one time-domain occasion, M being a positive integer; when M is greater than 1, at least one of the first search space set or the first identifier is used to determine the first occasion set out of the M occasion sets.

In one embodiment, a first occasion set is determined by introducing a plurality of occasion sets and according to at least one of a first search space set or a first identifier, so an independent time-domain resource allocation list (comprising a slot interval and an SLIV) for groupcast or multicast traffic is introduced, flexible configuration of groupcast or broadcast traffic is supported, and different requirements for groupcast or broadcast traffic when designing HARQ-ACK codebooks are considered, so as to optimize transmission performance of groupcast or multicast traffic and ensure effectiveness of the HARQ-ACK.

According to one aspect of the present disclosure, the above method is characterized in comprising:

receiving a first signal; and transmitting a third information block;

herein, the first PDCCH is used to determine time-frequency resources occupied by the first signal; the first identifier is used for a scrambling sequence of the first signal, the first signal belongs to the first serving cell, and one of the X bit subsets is used to indicate whether the first signal is correctly received; and the third information block is used to indicate that the first node supports X being greater than 1.

The present disclosure provides a method in a second node for wireless communications, comprising:

transmitting a first information block;

transmitting a first PDCCH, a control channel candidate occupied by the first PDCCH belonging to a first search space set; and receiving W bit sets, the first information block being used to indicate the W bit sets, each of the W bit sets comprising at least one HARQ-ACK bit, W being a positive integer greater than 1;

herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

According to one aspect of the present disclosure, the above method is characterized in that the W bit sets are respectively carried by W signals, and time-domain resources occupied by any two of the W signals are orthogonal; the W signals are respectively triggered by PDCCHs comprised in W control resource pools, and indexes of any two of the W control resource pools are unequal; one of the W signals carrying the first bit set is a target signal, and the first control resource pool is one of the W control resource pools comprising a PDCCH triggering the target signal.

According to one aspect of the present disclosure, the above method is characterized in that the X cell groups are indexed in order, and at least one of the first search space set or the first identifier is used to determine an index of a cell group to which the first serving cell belongs; the X bit subsets are concatenated to generate the first bit set, and an order of indexes of the X cell groups is used to determine a concatenation order of the X bit subsets.

According to one aspect of the present disclosure, the above method is characterized in comprising:

transmitting a second information block;

herein, the second information block is used to indicate a first time-domain resource block, and the first time-domain resource set comprises more than one time-domain resource blocks; the first PDCCH is used to determine a target time-domain resource block, the target time-domain resource block belongs to a second time-domain resource set, and the second time-domain resource set comprises more than one time-domain resource blocks; whether there exist fully or partially overlapped time-domain resource blocks between the first time-domain resource set and the second time-domain resource set is used to determine the X cell groups.

According to one aspect of the present disclosure, the above method is characterized in that a first bit subset is one of the X bit subsets, the first bit subset comprises a first bit block, the first bit block comprises at least one bit, and any bit comprised in the first bit block belongs to the first bit subset; the first bit block corresponds to a first time-domain occasion, the first time-domain occasion is a time-domain occasion comprised in a first occasion set, the first occasion set comprises at least one time-domain occasion, and a position of the first time-domain occasion in the first occasion set is used to determine the first bit block in the first bit subset.

According to one aspect of the present disclosure, the above method is characterized in that the first occasion set is one of M occasion sets, and any of the M occasion sets comprises at least one time-domain occasion, M being a positive integer; when M is greater than 1, at least one of the first search space set or the first identifier is used to determine the first occasion set out of the M occasion sets.

According to one aspect of the present disclosure, the above method is characterized in comprising:
transmitting a first signal; and
receiving a third information block;
herein, the first PDCCH is used to determine time-frequency resources occupied by the first signal; the first identifier is used for a scrambling sequence of the first signal, the first signal belongs to the first serving cell, and one of the X bit subsets is used to indicate whether the first signal is correctly received; the third information block is used to indicate that a transmitting device of the third information block supports X being greater than 1.

The present disclosure provides a first node for wireless communications, comprising:
a first receiver, receiving a first information block;
a second receiver, receiving a first PDCCH, a control channel candidate occupied by the first PDCCH belonging to a first search space set; and
a first transmitter, transmitting W bit sets, the first information block being used to determine the W bit sets, each of the W bit sets comprising at least one HARQ-ACK bit, W being a positive integer greater than 1;
herein, the first search space set is associated with a first control resource set, the first control resource set belongs to a first control resource pool, and the first control resource pool comprises at least one control resource set;
the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

The present disclosure provides a second node for wireless communications, comprising:
a second transmitter, transmitting a first information block;
a third transmitter, transmitting a first PDCCH, a control channel candidate occupied by the first PDCCH belonging to a first search space set; and
a third receiver, receiving W bit sets, the first information block being used to indicate the W bit sets, each of the W bit sets comprising at least one HARQ-ACK bit, W being a positive integer greater than 1;
herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

In one embodiment, the method in the present disclosure is advantageous in the following aspects:
by adopting the method in the present disclosure, when a separate HARQ-ACK codebook is adopted for multiple TRPs, a HARQ-ACK codebook to which HARQ-ACK transmission of groupcast or broadcast traffic belongs is judged according to a TRP to which a PDCCH scheduling groupcast or broadcast traffic belongs, so as to ensure the accurate transmission of HARQ-ACK of groupcast or broadcast traffic.
by adopting the method in the present disclosure, HARQ-ACK for groupcast or multicast transmission is regarded as a virtual cell and a unicast HARQ-ACK of a same TRP are multiplexed to a same HARQ-ACK codebook during a HARQ-ACK feedback for groupcast or broadcast traffic, so as to ensure effective multiplexing with HARQ-ACK of other traffic (such as unicast) without introducing too many HARQ-ACK codebooks, thus improving resource utilization and reducing header overhead.
by adopting the method in the present disclosure, when HARQ-ACK codebooks of a HARQ-ACK comprising groupcast or multicast traffic are constructed, determination of implicit HARQ-ACK codebooks is realized, which ensures an accurate transmission of the HARQ-ACK, thus reducing signaling overhead;
the method in the present disclosure supports a determination method of a sub-codebook of an implicit HARQ-ACK codebook, and header overhead of HARQ-ACK codebooks and overhead for configuring signalings are saved as much as possible when the multiplexing transmission of a HARQ-ACK of groupcast or broadcast traffic and a HARQ-ACK of unicast traffic is ensured;
the method in the present disclosure introduces an independent time-domain resource allocation list (comprising a slot interval and an SLIV) for groupcast or multicast traffic, supports flexible configuration of groupcast or broadcast traffic, and considers different requirements for groupcast or broadcast traffic when designing HARQ-ACK codebooks, so as to optimize transmission performance of groupcast or multicast traffic and ensure effectiveness of the HARQ-ACK.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of W signals according to one embodiment of the present disclosure;

FIG. 7 illustrates a schematic diagram of X bit subsets according to one embodiment of the present disclosure;

FIG. 8 illustrates a schematic diagram of a relation between a first time-domain resource set and a second time-domain resource set according to one embodiment of the present disclosure;

FIG. 9 illustrates a schematic diagram of a first bit block according to one embodiment of the present disclosure;

FIG. 10 illustrates a schematic diagram of M occasion sets according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
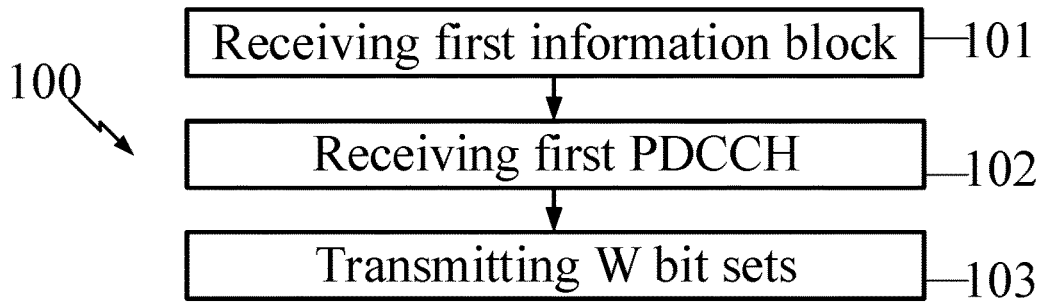
FIG. 1 illustrates a flowchart of a first information block, a first PDCCH and W bit sets according to one embodiment of the present disclosure.

Embodiment 1 illustrates a flowchart of a first information block, a first PDCCH and W bit sets according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a first node in the present disclosure receives a first information block in step 101; receives a first PDCCH in step 102, a control channel candidate occupied by the first PDCCH belongs to a first search space set; and transmits W bit sets in step 103, the first information block is used to determine the W bit sets, each of the W bit sets comprises at least one HARQ-ACK bit, W being a positive integer greater than 1; herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

In one embodiment, the first information block is transmitted via an air interface.

In one embodiment, the first information block is transmitted via a radio interface.

In one embodiment, a transmitter of the first information comprises the second node in the present disclosure.

In one embodiment, the first information block comprises all or part of a higher-layer signaling.

In one embodiment, the first information block comprises all or part of a physical-layer signaling.

In one embodiment, the first information block comprises all or part of a Radio Resource Control (RRC) layer signaling.

In one embodiment, the first information block comprises all or part of a Medium Access Control (MAC) layer signaling.

In one embodiment, the first information block comprises all or part of a System Information Block (SIB).

In one embodiment, the first information block is Cell-Specific.

In one embodiment, the first information block is UE-specific.

In one embodiment, the first information block is Per Serving Cell configured.

In one embodiment, the first information block comprises all or partial fields of a Downlink Control Information (DCI) signaling.

In one embodiment, the first information block comprises more than one sub-information blocks, and each sub-information block comprised in the first information block is an IE or a field in an RRC signaling to which the first information block belongs; and one or a plurality of sub-information blocks comprised in the first information block are used to determine the W bit sets.

In one embodiment, the first information block comprises all or partial fields in an IE "PhysicalCellGroupConfig" in an RRC signaling.

In one embodiment, the first information block comprises a field "ackNackFeedbackMode-r16" in an RRC signaling.

In one embodiment, the first information block comprises all or partial fields in an Information Element (IE) "CellGroupConfig" in an RRC signaling.

In one embodiment, the first information block comprises a field "ackNackFeedbackMode-r17" in an RRC signaling.

In one embodiment, the first information block comprises a field "ackNackFeedbackModePTM-r17" in an RRC signaling.

In one embodiment, an expression of "the first information block being used to determine the W bit sets" in the claim includes the following meaning: the first information block is used by the first node in the present disclosure to determine the W bit sets.

In one embodiment, an expression of "the first information block being used to determine the W bit sets" in the claim includes the following meaning: the first information block is used to explicitly indicate the W bit sets.

In one embodiment, an expression of "the first information block being used to determine the W bit sets" in the claim includes the following meaning: the first information block is used to implicitly indicate the W bit sets.

In one embodiment, an expression of "the first information block being used to determine the W bit sets" in the claim includes the following meaning: the first information block is used to determine W.

In one embodiment, an expression of "the first information block being used to determine the W bit sets" in the claim includes the following meaning: the first information block is used to determine that W is greater than 1.

In one embodiment, an expression of "the first information block being used to determine the W bit sets" in the claim includes the following meaning: the first information block indicates a separate ACK/NACK feedback, and the separate ACK/NACK feedback is used to determine that W is greater than 1.

In one embodiment, an expression of "the first information block being used to determine the W bit sets" in the claim includes the following meaning: the first information block indicates a separate HARQ-ACK codebook, and the separate HARQ-ACK codebook is used to determine that W is greater than 1.

In one embodiment, an expression of "the first information block being used to determine the W bit sets" in the claim includes the following meaning: the first information block indicates that a mode of ACK/NACK feedback is separate, and the separate ACK/NACK feedback mode is used to determine that W is greater than 1.

In one embodiment, an expression of "the first information block being used to determine the W bit sets" in the claim includes the following meaning: the first information block indicates that a mode of ACK/NACK feedback of a Point to Multi-Point (PTM) is separate, and the separate ACK/NACK feedback mode is used to determine that W is greater than 1.

In one embodiment, the first PDCCH is a transmission of a Physical Downlink Control Channel (PDCCH).

In one embodiment, the first PDCCH occupies a control channel candidate.

In one embodiment, the first PDCCH carries DCI.

In one embodiment, the first PDCCH carries a DCI format.

In one embodiment, a DCI payload of a DCI format is used to generate the first PDCCH.

In one embodiment, the first PDCCH is a baseband signal of a PDCCH.

In one embodiment, the first PDCCH is a radio-frequency signal of a PDCCH.

In one embodiment, the first search space set comprises at least one control channel candidate.

In one embodiment, the first search space set comprises more than one control channel candidates.

In one embodiment, the first search space set comprises at least one control channel candidate, and any control channel candidate comprised in the first search space set occupies at least one Control Channel Element (CCE) occupied in time-frequency domain.

In one embodiment, the first search space set comprises at least one control channel candidate, and a number of CCE(s) occupied by any control channel candidate comprised in the first search space set is equal to 1, 2, 4, 8 and 16.

In one embodiment, the first search space set comprises at least one control channel candidate, and any control channel candidate comprised in the first search space set is a PDCCH candidate.

In one embodiment, the first search space set comprises at least one control channel candidate, and any control channel candidate comprised in the first search space set is a monitored PDCCH candidate.

In one embodiment, the first search space set comprises at least one control channel candidate, and any control channel candidate comprised in the first search space set is a PDCCH candidate adopting one or a plurality of DCI formats.

In one embodiment, the first search space set comprises at least one control channel candidate, and any control channel candidate comprised in the first search space set is a PDCCH candidate adopting one or a plurality of DCI payload sizes.

In one embodiment, the first search space set is a UE-Specific Search Space Set (USS Set).

In one embodiment, the first search space set is a Cell-Specific Search Space Set (CSS Set).

In one embodiment, the first search space set is a Search Space Set of a Physical Downlink Control Channel (PDCCH).

In one embodiment, the first search space set is a cell-specific search space set of Type0-PDCCH.

In one embodiment, the first search space set is a cell-specific search space set of Type1-PDCCH.

In one embodiment, the first search space set is a cell-specific search space set of Type0A-PDCCH.

In one embodiment, the first search space set is a cell-specific search space set of Type2-PDCCH.

In one embodiment, the first search space set is a cell-specific search space set of Type3-PDCCH.

In one embodiment, the first search space set is a cell-specific search space set of Type4-PDCCH.

In one embodiment, the first search space set is a cell-specific search space set of Type5-PDCCH.

In one embodiment, the first search space set comprises two control channel candidates occupying same time-frequency resources.

In one embodiment, indexes of any two control channel candidates comprised in the first Search Space Set are different.

In one embodiment, CCEs occupied by any two control channel candidates comprised in the first Search Space Set are different.

In one embodiment, the first Search Space Set comprises that two control channel candidates occupy a same CCE set.

In one embodiment, any of the W bit sets comprises one or a plurality of fields in Uplink Control Information (UCI).

In one embodiment, a bit comprised in any of the W bit sets belongs to a UCI payload.

In one embodiment, any of the W bit sets is a Hybrid Automatic Repeat Request-Acknowledgement (HARQ-ACK) codebook.

In one embodiment, each bit comprised in any of the W bit sets is a HARQ-ACK bit.

In one embodiment, any of the W bit sets is a Type-1 HARQ-ACK codebook.

In one embodiment, any of the W bit sets is a Type-2 HARQ-ACK codebook.

In one embodiment, any of the W bit sets is a Type-3 HARQ-ACK codebook.

In one embodiment, any of the W bit sets is a Type-4 HARQ-ACK codebook.

In one embodiment, any of the W bit sets is carried through an uplink channel.

In one embodiment, any of the W bit sets is carried through a Physical Uplink Control Channel (PUCCH).

In one embodiment, any of the W bit sets is piggybacked through a Physical Uplink Shared Channel (PUSCH).

In one embodiment, there exist two of the W bit sets respectively being HARQ-ACK codebooks of two different types.

In one embodiment, any two of the W bit sets is a HARQ-ACK codebook of a same type.

In one embodiment, any two of the W bit sets are respectively carried through two signals or channels occupying orthogonal time-frequency resources.

In one embodiment, there exists one of the W bit sets being piggybacked through a PUSCH, and there exists one of the W bit sets being carried through a PUCCH.

In one embodiment, any of the W bit sets only comprises a HARQ-ACK bit.

In one embodiment, there exists one of the W bit sets comprising a bit other than a HARQ-ACK bit.

In one embodiment, the first receiver in the present disclosure receives a fourth information block, and the fourth information block is used to determine that the first search space set and the first control resource set are associated. In one subsidiary embodiment of the above embodiment, two different fields in the fourth information block are respectively used to determine the first Search Space Set and the first control resource set. In one subsidiary embodiment of the above embodiment, the fourth information block is used to indicate R1 Search Space Set(s), and the first Search Space Set is one of the R1 Search Space Set(s), R1 being a positive integer; the R1 search space set(s) is (are respectively) associated with R1 control resource set(s), and the first control resource set is one of the R1 control resource set(s) associated with the first search space set. In one subsidiary embodiment of the above embodiment, a field comprised in the fourth information block is used to indicate a first IE, the first IE comprises a first field and a second field, the first field is used to indicate an index of the first search space set, and the second field is used to indicate an index of the first control resource set. In one subsidiary embodiment of the above embodiment, the fourth information block is used to determine an index of a control resource pool to which the first control resource set belongs.

In one embodiment, a CCE occupied by any control channel candidate comprised in the first search space set belongs to the first control resource set.

In one embodiment, an index of the first search space set and an index of the first control resource set are associated.

In one embodiment, an index of the first search space set and an index of the first control resource set are indicated by two different fields in a same IE.

In one embodiment, the first control resource set is used to determine a mapping between a CCE occupied by any control channel candidate comprised in the first search space set and an occupied REG.

In one embodiment, the first control resource set is used to determine a Quasi co-location of any control channel candidate comprised in the first search space set.

In one embodiment, the first control resource set comprises more than one CCEs.

In one embodiment, the first control resource set is a Control Resource Set (CORESET).

In one embodiment, the first control resource set comprises more than one CCEs, and any two CCEs comprised in the first control resource set belong to a same CORESET.

In one embodiment, the first control resource set is allocated a CORESET index.

In one embodiment, the first control resource pool comprises at least one CORESET.

In one embodiment, the first control resource pool comprises more than one CORESETs.

In one embodiment, the first control resource pool is a CORESET pool.

In one embodiment, the first control resource pool belongs to H candidate control resource pools, H being a positive integer greater than 1; indexes of any two of the H candidate control resource pools are unequal. In one subsidiary embodiment of the above embodiment, H is equal to 2. In one subsidiary example of the above embodiment, QCLs of any two candidate control resource pools in the H candidate control resource pools are different. In one subsidiary embodiment of the above embodiment, H is equal to 2, and indexes of the H candidate control resource pools are respectively "0" and "1". In one subsidiary embodiment of the above embodiment, any two of the H candidate control resource pools belong to different Transmit Receive Points (TRPs). In one subsidiary embodiment of the above embodiment, any two of the H candidate control resource pools belong to different panels. In one subsidiary embodiment of the above embodiment, initial values of a scrambling sequence of control channel candidates comprised in any two of the H candidate control resource pools are unequal. In one subsidiary embodiment of the above embodiment, the H candidate control resource pools are predefined or configurable.

In one embodiment, the first bit set is one of the W bit sets.

In one embodiment, an expression of "the first control resource pool being used to determine a first bit set out of the W bit sets" in the claim includes the following meaning: the first control resource pool is used by the first node in the present disclosure to determine the first bit set out of the W bit sets.

In one embodiment, an expression of "the first control resource pool being used to determine a first bit set out of the W bit sets" in the claim includes the following meaning: an index of the first control resource pool is used to determine the first bit set out of the W bit sets.

In one embodiment, an expression of "the first control resource pool being used to determine a first bit set out of the W bit sets" in the claim includes the following meaning: the W bit sets respectively correspond to W indexes, an index of the first control resource pool is equal to the W indexes, and the first bit set is one of the W bit sets corresponding to an index of the first control resource pool.

In one embodiment, an expression of "the first control resource pool being used to determine a first bit set out of the W bit sets" is implemented through claim 2 in the present disclosure.

In one embodiment, an expression of "the first control resource pool being used to determine a first bit set out of the W bit sets" in the claim includes the following meaning: the first bit set is one of the W bit sets associated with the first control resource pool.

In one embodiment, an expression of "the first control resource pool being used to determine a first bit set out of the W bit sets" in the claim includes the following meaning: a type of the first control resource pool is used to determine the first control resource pool out of the W bit sets.

In one embodiment, X is equal to 2.

In one embodiment, X is equal to 3.

In one embodiment, X is greater than 3.

In one embodiment, each of the X bit subsets comprises at least one HARQ-ACK bit.

In one embodiment, a bit subset comprised in the X bit subsets comprises more than one HARQ-ACK bits.

In one embodiment, a bit subset comprised in the X bit subsets only comprises one HARQ-ACK bit.

In one embodiment, any of the X bit subsets is a HARQ-ACK codebook.

In one embodiment, any of the X bit subsets is a HARQ-ACK sub-codebook.

In one embodiment, any of the X bit subsets is a subset of a HARQ-ACK codebook.

In one embodiment, any bit comprised in any of the X bit subsets is used to indicate a ACK or a Non-Acknowledgement (NACK).

In one embodiment, a bit comprised in any of the X bit subsets belongs to the first bit set.

In one embodiment, there exists one of the X cell groups comprising a Primary Cell (Pcell).

In one embodiment, there exists one of the X cell groups comprising a Secondary Cell (Scell).

In one embodiment, there exists one of the X cell groups comprising a Special Cell (SPCell).

In one embodiment, the X cell groups are indexed in order.

In one embodiment, serving cells comprised in any of the X cell groups are indexed in order.

In one embodiment, serving cells comprised in any of the X cell groups are arranged in order according to indexes of serving cells.

In one embodiment, serving cells comprised in any of the X cell groups are arranged in an ascending or descending order according to indexes of serving cells.

In one embodiment, any serving cell comprised in any of the X cell groups corresponds to a carrier.

In one embodiment, any serving cell comprised in any of the X cell groups correspond to all or part of a carrier.

In one embodiment, there exist two of the X cell groups comprising a same serving cell.

In one embodiment, serving cells comprised in any two of the X cell groups are different.

In one embodiment, there exist two of the X cell groups comprising a completely same serving cell.

In one embodiment, there exist serving cells comprised in two of the X cell groups being not completely the same.

In one embodiment, an expression of "the X bit subsets being respectively for X cell groups" in the claim includes the following meaning: the X bit subsets are respectively used to indicate a HARQ-ACK for the X cell groups.

In one embodiment, an expression of "the X bit subsets being respectively for X cell groups" in the claim includes the following meaning: the X bit subsets are respectively associated with the X cell groups.

In one embodiment, an expression of "the X bit subsets being respectively for X cell groups" in the claim includes the following meaning: the X bit subsets respectively correspond to the X cell groups.

In one embodiment, an expression of "the X bit subsets being respectively for X cell groups" in the claim includes the following meaning: the X bit subsets are respectively used to indicate a HARQ-ACK of a downlink transmission in the X cell groups.

In one embodiment, an expression of "the X bit subsets being respectively for X cell groups" in the claim includes the following meaning: the X bit subsets are respectively used to indicate a HARQ-ACK of a potential downlink transmission in the X cell groups.

In one embodiment, an expression of "the X bit subsets being respectively for X cell groups" in the claim includes the following meaning: the X bit subsets are respectively used to indicate HARQ-ACKs of PDSCHs (comprising PDSCHs of an actual transmission and a virtual transmission) in the X cell groups.

In one embodiment, an expression of "the X bit subsets being respectively for X cell groups" in the claim includes the following meaning: the X bit subsets are respectively used to indicate a HARQ-ACK of a candidate PDSCH occasion in the X cell groups.

In one embodiment, an expression of "the X bit subsets being respectively for X cell groups" in the claim includes the following meaning: the X bit subsets are respectively used for the X cell groups.

In one embodiment, the first serving cell is a Pcell.

In one embodiment, the first serving cell is an Scell.

In one embodiment, the first serving cell is an SPcell.

In one embodiment, the first serving cell belongs to a Master Cell Group (MCG).

In one embodiment, the first serving cell belongs to a Secondary Cell Group (SCG).

In one embodiment, the first serving cell only belongs to one of the X cell groups.

In one embodiment, the first serving cell belongs to a plurality of cell groups in the X cell groups at the same time.

In one embodiment, the first serving cell is self-scheduled.

In one embodiment, the first serving cell is cross-carrier scheduled.

In one embodiment, an expression of "the first PDCCH being used for a first serving cell" in the claim includes the following: the first PDCCH is used to schedule the first serving cell.

In one embodiment, an expression of "the first PDCCH being used for a first serving cell" in the claim includes the following: DCI carried by the first PDCCH is used to schedule the first serving cell.

In one embodiment, an expression of "the first PDCCH being used for a first serving cell" in the claim includes the following: the first PDCCH is used to schedule a channel or a signal transmitted on the first serving cell.

In one embodiment, an expression of "the first PDCCH being used for a first serving cell" in the claim includes the following: a control resource set associated with the first search space set belongs to a Bandwidth Part (BWP) comprised in the first serving cell.

In one embodiment, an expression of "the first PDCCH being used for a first serving cell" in the claim includes the following: a serving cell to which a control resource set associated with the first search space set belongs is a scheduling cell of the first serving cell.

In one embodiment, an expression of "the first PDCCH being used for a first serving cell" in the claim includes the following: the first serving cell is a scheduling cell of a serving cell to which a control resource set associated with the first search space set belongs.

In one embodiment, an expression of "the first PDCCH being used for a first serving cell" in the claim includes the following: frequency-domain resources occupied by the first PDCCH belongs to the first serving cell.

In one embodiment, an expression of "the first PDCCH being used for a first serving cell" in the claim includes the following: frequency-domain resources occupied by the first PDCCH belongs to a scheduling cell of the first serving cell.

In one embodiment, the first identifier is an RNTI.

In one embodiment, the first identifier is a Cell-Radio Network Temporary Identifier (C-RNTI).

In one embodiment, the first identifier is a Configured Scheduling-Radio Network Temporary Identifier (CS-RNTI).

In one embodiment, the first identifier is a Group-Radio Network Temporary Identifier (G-RNTI).

In one embodiment, the first identifier is a Multicast (and Broadcast Services)-Radio Network Temporary Identifier (M-RNTI).

In one embodiment, the first identifier is a Single Cell-Radio Network Temporary Identifier (SC-RNTI).

In one embodiment, the first identifier is a Single Cell-Notification-Radio Network Temporary Identifier (SC-N-RNTI).

In one embodiment, the first identifier is one of a C-RNTI, a CS-RNTI, a G-RNTI, an M-RNTI, an SC-RNTI and an SC-N-RNTI.

In one embodiment, the first identifier is one of C-RNTI and G-RNTI.

In one embodiment, the first identifier is an index value.

In one embodiment, the first identifier is a non-negative integer.

In one embodiment, the first identifier is a positive integer.

In one embodiment, the first identifier is an integer.

In one embodiment, the first identifier is an integer represented in decimal.

In one embodiment, the first identifier is an integer represented in hexadecimal.

In one embodiment, an expression of "the first PDCCH being used to determine a first identifier" in the claim includes the following meaning: the first PDCCH carries the first identifier.

In one embodiment, an expression of "the first PDCCH being used to determine a first identifier" in the claim includes the following meaning: the first identifier is used for a scrambling sequence of a first PDCCH.

In one embodiment, an expression of "the first PDCCH being used to determine a first identifier" in the claim includes the following meaning: the first identifier is used for a scrambling sequence of an output bit of DCI carried by the first PDCCH after channel coding.

In one embodiment, an expression of "the first PDCCH being used to determine a first identifier" in the claim includes the following meaning: the first identifier is used to initialize a scrambling sequence generator of an output bit of DCI carried by the first PDCCH after channel coding.

In one embodiment, an expression of "the first PDCCH being used to determine a first identifier" in the claim includes the following meaning: the first identifier is used for a scrambling sequence of a CRC bit of DCI carried by the first PDCCH.

In one embodiment, an expression of "the first PDCCH being used to determine a first identifier" in the claim includes the following meaning: a CRC bit of DCI carried by the first PDCCH carries the first identifier.

In one embodiment, an expression of "the first PDCCH being used to determine a first identifier" in the claim includes the following meaning: a channel or signal scheduled by DCI carried by the first PDCCH carries the first identifier.

In one embodiment, an expression of "the first PDCCH being used to determine a first identifier" in the claim includes the following meaning: the first identifier is used to generate a scrambling sequence of a channel or a signal scheduled by DCI carried by the first PDCCH.

In one embodiment, an expression of "the first PDCCH being used to determine a first identifier" in the claim includes the following meaning: the first identifier is used to initialize a scrambling sequence generator of a channel or a signal scheduled by DCI carried by the first PDCCH.

In one embodiment, an expression of "the first PDCCH being used to determine a first identifier" in the claim is implemented through claim 7 in the present disclosure.

In one embodiment, an expression of "the first PDCCH being used to determine a first identifier" in the claim includes the following meaning: the first PDCCH is used by the first node in the present disclosure to determine the first identifier.

In one embodiment, an expression of "the first PDCCH being used to determine a first identifier" in the claim includes the following meaning: one or a plurality of fields comprised in DCI carried by the first PDCCH explicitly indicates the first identifier.

In one embodiment, an expression of "at least one of the first search space set or the first identifier is used to determine a cell group to which the first serving cell belongs out of the X cell groups" in the claim includes the following meaning: at least one of the first search space set or the first identifier is used by the first node in the present disclosure to determine a cell group to which the first serving cell belongs out of the X cell groups.

In one embodiment, an expression of "at least one of the first search space set or the first identifier is used to determine a cell group to which the first serving cell belongs out of the X cell groups" in the claim includes the following meaning: the first search space set and the first identifier are both used to determine a cell group to which the first serving cell belongs out of the X cell groups.

In one embodiment, an expression of "at least one of the first search space set or the first identifier is used to determine a cell group to which the first serving cell belongs out of the X cell groups" in the claim includes the following meaning: the first search space set is used to determine a cell group to which the first serving cell belongs out of the X cell groups.

In one embodiment, an expression of "at least one of the first search space set or the first identifier is used to determine a cell group to which the first serving cell belongs out of the X cell groups" in the claim includes the following meaning: the first identifier is used to determine a cell group to which the first serving cell belongs out of the X cell groups.

In one embodiment, an expression of "at least one of the first search space set or the first identifier is used to determine a cell group to which the first serving cell belongs out of the X cell groups" in the claim includes the following meaning: the X cell groups are indexed in order, and at least one of the first search space set or the first identifier is used to determine an index of a cell group to which the first serving cell belongs.

In one embodiment, an expression of "at least one of the first search space set or the first identifier is used to determine a cell group to which the first serving cell belongs out of the X cell groups" is implemented through claim 3 in the present disclosure.

In one embodiment, whether the first search space set is used to schedule groupcast or multicast traffic is used to determine a cell group to which the first serving cell belongs out of the X cell groups.

In one embodiment, monitoring whether a DCI format adopted by a control channel candidate comprised in the first search space set comprises a DCI format for scheduling groupcast or multicast traffic is used to determine a cell group to which the first serving cell belongs out of the X cell groups.

In one embodiment, monitoring whether an RNTI adopted by a control channel candidate comprised in the first search space set comprises an RNTI of groupcast or multicast traffic is used to determine a cell group to which the first serving cell belongs out of the X cell groups.

In one embodiment, the first search space set is used to determine a cell group to which the first serving cell belongs out of the X cell groups according to a condition relation.

In one embodiment, a target cell group is one of the X cell groups, and the first search space set is used to determine whether the first serving cell belongs to the target cell group.

In one embodiment, a target cell group is one of the X cell groups, and whether the first search space set is used for groupcast or multicast traffic is used to determine whether the first serving cell belongs to the target cell group.

In one embodiment, a target cell group is one of the X cell groups, monitoring whether an RNTI (or a DCI format) adopted by a control channel candidate comprised in the first search space set comprises an RNTI of groupcast or multicast traffic (or a DCI format) being used for groupcast or multicast traffic is used to determine whether the first serving cell belongs to the target cell group.

In one embodiment, the first identifier belongs to one of Q1 candidate identifier sets, Q1 being a positive integer greater than 1, and any of the Q1 candidate identifier sets comprises at least one candidate identifier, and any candidate identifier comprised in any of the Q1 candidate identifier sets is an RNTI; a candidate identifier set to which the first identifier belongs is used to determine a cell group to which the first serving cell belongs out of the X cell groups.

In one embodiment, whether the first identifier is used for groupcast or multicast traffic is used to determine a cell group to which the first serving cell belongs out of the X cell groups.

In one embodiment, a target cell group is one of the X cell groups, and whether the first identifier is used for groupcast or multicast traffic is used to determine whether the first serving cell belongs to the target cell group.

In one embodiment, a target cell group is one of the X cell groups, and whether the first identifier is equal to a specific identifier is used to determine whether the first serving cell belongs to the target cell group. In one subsidiary embodiment of the above embodiment, the specific identifier is one of a G-RNTI, an M-RNTI, an SC-RNTI and an SC-N-RNTI. In one subsidiary embodiment of the above embodiment, the specific identifier is used for an RNTI of groupcast or broadcast traffic. In one subsidiary embodiment of the above embodiment, the specific identifier is used for an identifier of groupcast or broadcast traffic.

In one embodiment, a target cell group is one of the X cell groups, whether the first identifier belongs to a target identifier set is used to determine whether the first serving cell belongs to the target cell group, the target identifier set comprises at least one identifier. In one subsidiary embodiment of the above embodiment, the target identifier set is predefined. In one subsidiary embodiment of the above embodiment, the target identifier set comprises an identifier used for groupcast or broadcast traffic. In one subsidiary embodiment of the above embodiment, the target identifier set is configurable. In one subsidiary embodiment of the above embodiment, the target identifier set is fixed.

In one embodiment, the first control resource set belongs to a scheduling cell of the first serving cell.

In one embodiment, the first control resource set belongs to a BWP of a scheduling cell of the first serving cell in frequency domain.

In one embodiment, the first control resource set belongs to the first serving cell.

In one embodiment, the first control resource set belongs to a BWP of the first serving cell in frequency domain.

Embodiment 2

Figure 2:
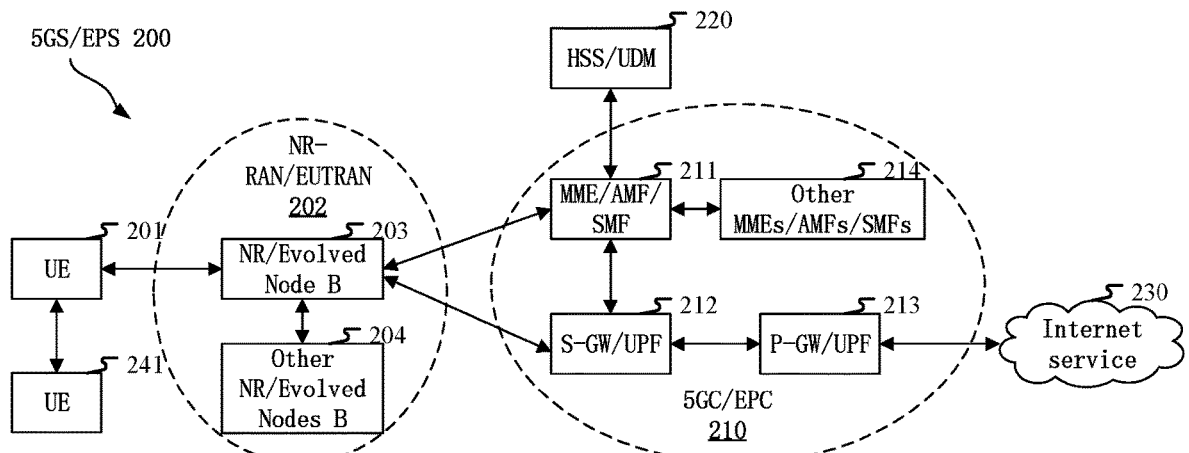
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 illustrates a network architecture 200 of 5G NR, Long-Term Evolution (LTE) and Long-Term Evolution Advanced (LIE-A) systems. The 5G NR or LIE network architecture 200 may be called a 5G System (5GS)/ Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/ Unified Data Management (UDM) 220 and an Internet Service 230. The 5GS/EPS 200 may be interconnected with other access networks. For simple description, the entities/ interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN comprises an NR/evolved node B (gNB/eNB) 203 and other gNBs (eNBs) 204. The gNB (eNB) 203 provides UE 201—oriented user plane and control plane protocol terminations. The gNB (eNB) 203 may be connected to other gNBs (eNBs) 204 via an Xn/X2 interface (e.g., backhaul). The gNB (eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB (eNB) 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, test devices, test instrumentation, test tools or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB (eNB) 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports transmission of multi-groupcast or broadcast traffic.

In one embodiment, the gNB (eNB) 201 corresponds to the second node in the present disclosure.

In one embodiment, the gNB (eNB) 201 supports transmission of groupcast or broadcast traffic.

Embodiment 3

Figure 3:
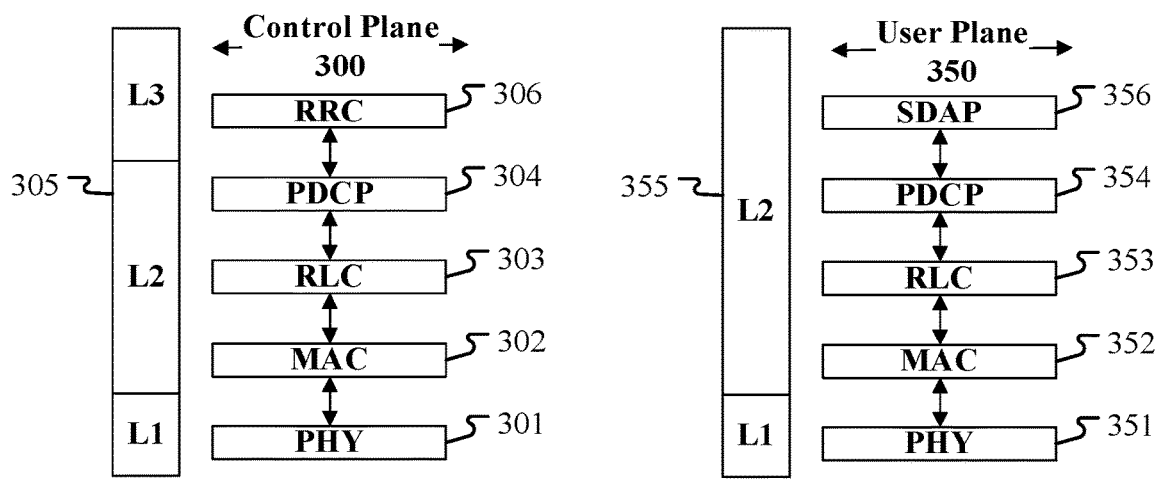
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first node (UE or gNB) and a second node (gNB or UE) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block in the present disclosure is generated by the RRC 306, or MAC 302, or MAC 352, or the PHY 301, or PHY 351.

In one embodiment, the first PDCCH in the present disclosure is generated by the PHY 301 or the PHY 351.

In one embodiment, the W bit sets in the present disclosure are generated by the PHY 301 or the PHY 351.

In one embodiment, the second information block in the present disclosure is generated by the RRC 306, or MAC 302, or MAC 352, or the PHY 301, or PHY 351.

In one embodiment, the first signal in the present disclosure is generated by the RRC 306, or MAC 302, or MAC 352, or the PHY 301, or PHY 351.

In one embodiment, the third information block in the present disclosure is generated by the RRC 306, or MAC 302, or MAC 352, or the PHY 301, or PHY 351.

Embodiment 4

Figure 4:
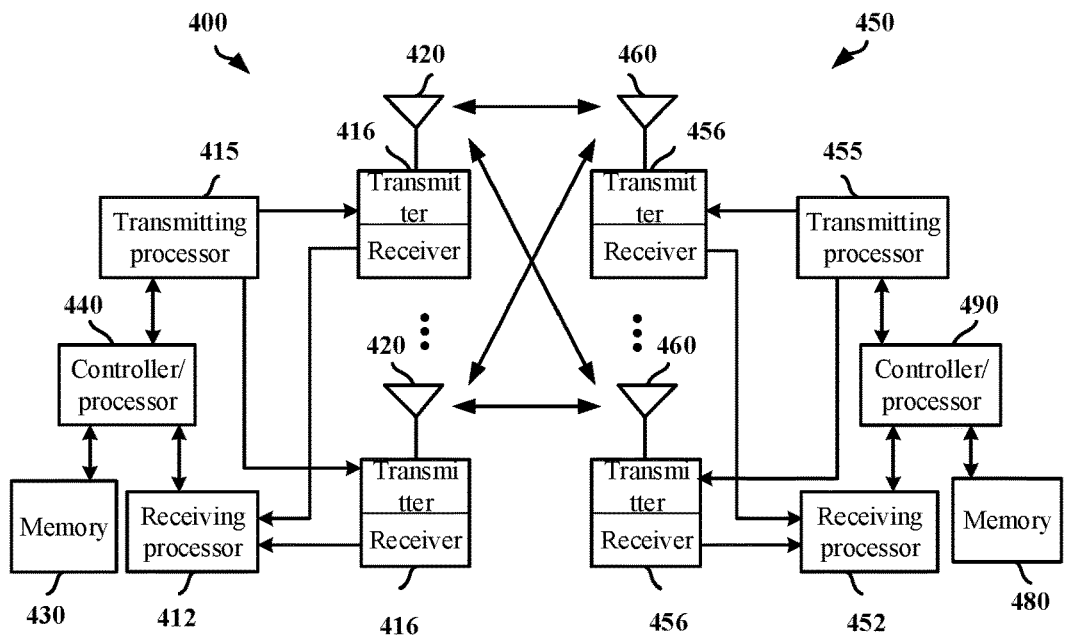
FIG. 4 illustrates a schematic diagram of a first node and a second node according to one embodiment of the present disclosure.

Embodiment 4 illustrates a schematic diagram of a first node and a second node according to one embodiment of the present disclosure, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460.

The second node (410) may comprise a controller/processor 440, a data source/buffer 430, a receiving processor 412, a transmitter/receiver 416 and a transmitting processor 415, wherein the transmitter/receiver 416 comprises an antenna 420.

In downlink (DL), a higher-layer packet, such as high-layer information comprised in a first information block, a second information block, and a first signal in the present disclosure, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, higher-layer information comprised in the first information block, the second information block and the first signal in the present disclosure is generated in the controller/processor 440. The transmitting processor 415 provides various signal-processing functions for the L1 layer (that is, PHY), including coding, interleaving, scrambling, modulating, power control/allocation, precoding and generation of physical-layer control signaling, such as the generation of the first PDCCH, a physical layer signal of the first signal, a physical layer signal carrying the first information block and a physical layer signal carrying the second information block in the present disclosure is completed at the transmitter 415. The generated modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing function includes a reception of a first PDCCH in the present disclosure, a physical layer signal of the first signal, a physical layer signal carrying the first information block and a physical layer signal carrying the second information block in the present disclosure. Multicarrier symbols in multicarrier symbol streams are demodulated based on varied modulation schemes (i.e., BPSCK, QPSK), and are then de-scrambled, decoded and de-interleaved to recover data or control signal transmitted by the second node 410 on a physical channel. And after that the data and control signal are provided to the controller/processor 490. The controller/processor 490 is in charge of the function of L2 layer and above layers, and the controller/processor 490 interprets higher layer information comprised in the first information block, the second information block and the first signal in the present disclosure. The controller/processor can be connected to a memory 480 that stores program code and data. The memory 480 may be called a computer readable medium.

In uplink (UL) transmission, similar to downlink transmission, higher-layer information comprises that the third information block in the present disclosure, after being generated by the controller/processor 490, implements various signal transmitting processing functions of L1 (that is, PHY) via the transmitting processor 455. W bit sets in the present disclosure are generated by the transmitting processor 455, and is transmitted by the transmitting processor 455 via the transmitter 456 mapped to the antenna 460 in the form of a radio frequency signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 implements various signal receiving processing functions for L1 layer (i.e., PHY), including receiving and processing W bit sets in the present disclosure and a physical layer signal carrying the third information block, and then providing data and/or a control signal to the controller/processor 440. The controller/processor 440 implements functions of L2 layer, including interpreting that the higher layer information comprises the third information block. The controller/processor can be connected to a buffer 430 that stores program code and data. The buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first information block; and receives a first PDCCH, a control channel candidate occupied by the first PDCCH belongs to a first search space set; and transmits W bit sets, the first information block is used to determine the W bit sets, each of the W bit sets comprises at least one HARQ-ACK bit, W being a positive integer greater than 1; herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

In one embodiment, the first node 450 comprises a memory that stores a computer readable instruction program. The computer readable instruction program generates an action when executed by at least one processor. The action includes: receiving a first information block; receiving a first PDCCH, a control channel candidate occupied by the first PDCCH belonging to a first search space set; and transmitting W bit sets, the first information block being used to determine the W bit sets, each of the W bit sets comprising at least one HARQ-ACK bit, W being a positive integer greater than 1; herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first information block; and transmits a first PDCCH, a control channel candidate occupied by the first PDCCH belongs to a first search space set; and receives W bit sets, the first information block is used to indicate the W bit sets, each of the W bit sets comprises at least one HARQ-ACK bit, W being a positive integer greater than 1; herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

In one embodiment, the second node 410 comprises a memory that stores a computer readable instruction program. The computer readable instruction program generates an action when executed by at least one processor. The action includes: transmitting a first information block; transmitting a first PDCCH, a control channel candidate occupied by the first PDCCH belonging to a first search space set; and receiving W bit sets, the first information block being used to indicate the W bit sets, each of the W bit sets comprising at least one HARQ-ACK bit, W being a positive integer greater than 1; herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

In one embodiment, the first node 450 is a UE.

In one embodiment, the first node 450 is a UE supporting groupcast or broadcast traffic.

In one embodiment, the second node 410 is a base station (gNB/eNB).

In one embodiment, the second node 410 is a base station supporting groupcast or broadcast traffic.

In one embodiment, the receiver 456 (including the antenna 460), the receiving processor 452 and the controller/processor 490 are used to receive the first information block in the present disclosure.

In one embodiment, the receiver 456 (including the antenna 460) and the receiving processor 452 are used to receive the first PDCCH in the present disclosure.

In one embodiment, the transmitter 456 (including the antenna 460), and the transmitting processor 455 are used to transmit the W bit sets in the present disclosure.

In one embodiment, the receiver 456 (including the antenna 460), the receiving processor 452 and the controller/processor 490 are used to receive the second information block in the present disclosure.

In one embodiment, the receiver 456 (including the antenna 460), the receiving processor 452 and the controller/processor 490 are used for receiving the first signal in the present disclosure.

In one embodiment, the transmitter 456 (including the antenna 460), the transmitting processor 455 and the controller/processor 490 are used to transmit the third information block in the present disclosure.

In one embodiment, the transmitter 416 (including the antenna 420), the transmitting processor 415 and the controller/processor 440 are used to transmit the first information block in the present disclosure.

In one embodiment, the transmitter 416 (including the antenna 420) and the transmitting processor 415 are used to transmit the first PDCCH in the present disclosure.

In one embodiment, the receiver 416 (including the antenna 420) and the receiving processor 412 are used receive the W bit sets in the present disclosure.

In one embodiment, the transmitter 416 (including the antenna 420), the transmitting processor 415 and the controller/processor 440 are used to transmit the second information block in the present disclosure.

In one embodiment, the transmitter 416 (including the antenna 420), the transmitting processor 415 and the controller/processor 440 are used to transmit the first signal in the present disclosure.

In one embodiment, the receiver 416 (including the antenna 420), the receiving processor 412 and the controller/processor 440 are used to receive the third information block in the present disclosure.

Embodiment 5

Figure 5:
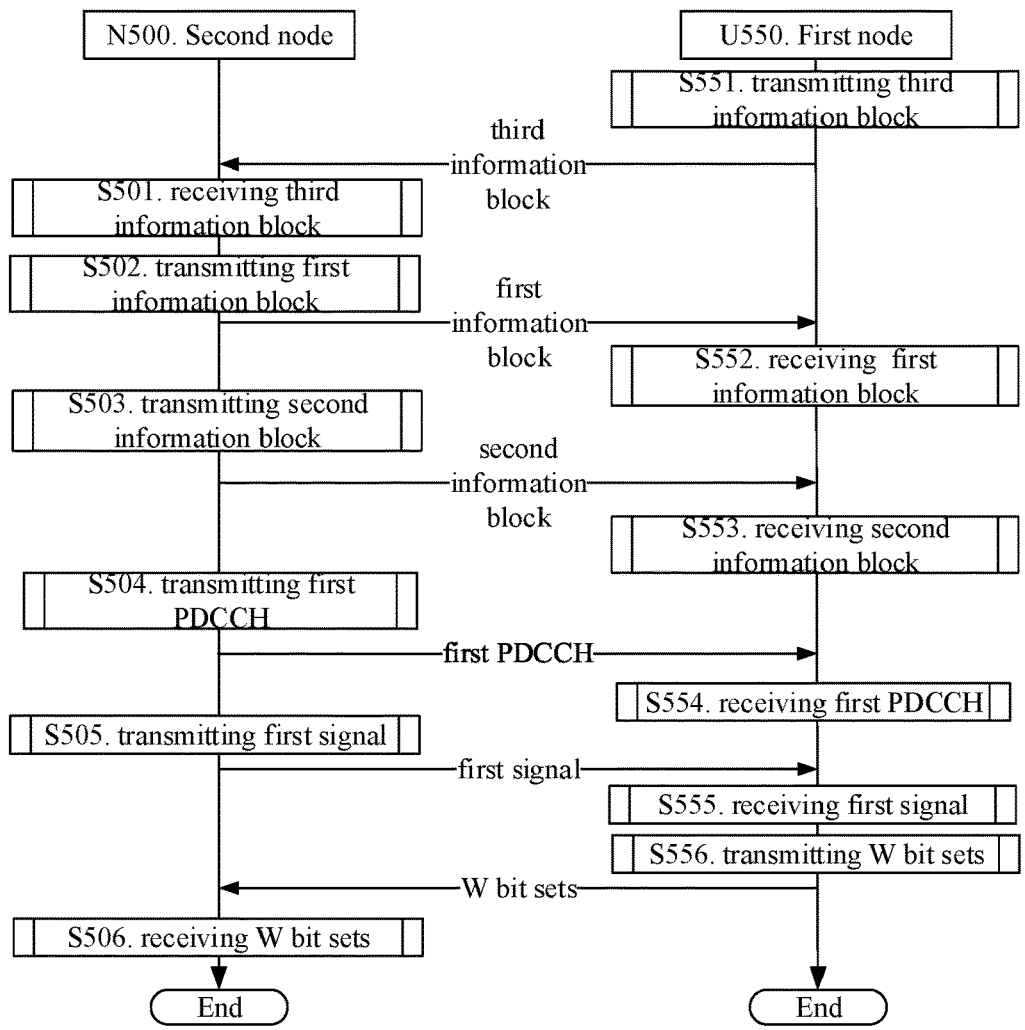
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a second node N500 is a maintenance base station of a serving cell of a first node U550. It is particularly underlined that the order illustrated in the embodiment does not put constraints over sequences of signal transmissions and implementations.

The second node N500 receives a third information block in step S501, transmits a first information block in step S502, transmits a second information block in step S503, transmits a first PDCCH in step S504, transmits a first signal in step S505, and receives W bit sets in step S506.

The first node U550 transmits a third information block in step S551, receives a first information block in step S552, receives a second information block in step S553, receives a first PDCCH in step S554, receives a first signal in step S555, and transmits W bit sets in step S556.

In embodiment 5, a control channel candidate occupied by the first PDCCH belongs to a first search space set; and the first information block is used to indicate the W bit sets, each of the W bit sets comprises at least one HARQ-ACK bit, W being a positive integer greater than 1; the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups; the second information block is used to determine a first time-domain resource set; the first PDCCH is used to determine time-frequency resources occupied by the first signal; the first identifier is used for a scrambling sequence of the first signal, the first signal belongs to the first serving cell, and one of the X bit subsets is used to indicate whether the first signal is correctly received; and the third information block is used to indicate that the first node supports X being greater than 1.

In one embodiment, the second information block is transmitted via an air interface.

In one embodiment, the second information block is transmitted via a radio interface.

In one embodiment, a transmitter of the second information comprises the second node in the present disclosure.

In one embodiment, the second information block comprises all or part of a higher-layer signaling.

In one embodiment, the second information block comprises all or part of a physical-layer signaling.

In one embodiment, the second information block comprises all or part of an RRC layer signaling.

In one embodiment, the second information block comprises all or part of a MAC layer signaling.

In one embodiment, the second information block comprises all or part of a System Information Block (SIB).

In one embodiment, the second information block is transmitted through a Physical Broadcast Channel (PBCH).

In one embodiment, the second information block is Cell-Specific.

In one embodiment, the second information block is UE-specific.

In one embodiment, the second information block is Per Serving Cell configured.

In one embodiment, the second information block comprises all or partial fields of a DCI signaling.

In one embodiment, the second information block comprises all or partial fields in an IE "BWP-Downlink" in an RRC signaling.

In one embodiment, the second information block comprises all or partial fields in an IE "BWP-DownlinkDedicated" in an RRC signaling.

In one embodiment, the second information block comprises all or part of fields in an IE "PDSCH-Config" in an RRC signaling.

In one embodiment, the second information block comprises all or partial fields in an IE "PDSCH-ConfigPTM" in an RRC signaling.

In one embodiment, the second information block comprises all or partial fields in an IE "PDSCH-ConfigCommon" in an RRC signaling.

In one embodiment, the second information block comprises a field "pdsch-TimeDomainAllocationList" in an RRC signaling.

In one embodiment, the second information block comprises a field "pdsch-TimeDomainAllocationListForPTM" in an RRC signaling.

In one embodiment, the second information block comprises a field "pdsch-TimeDomainAllocationListDCI-2-x1-r17" in an RRC signaling, where x1 is a positive integer greater than 6.

In one embodiment, the second information block comprises all or partial fields in an IE "PDSCH-TimeDomainResourceAllocationList" in an RRC signaling.

In one embodiment, the second information block comprises all or partial fields in an IE "dl-DataToUL-ACK" in an RRC signaling.

In one embodiment, the second information block comprises all or partial fields in an IE "PUCCH-Config" in an RRC signaling.

In one embodiment, the second information block comprises all or partial fields in an IE "dl-DataToUL-ACK-ForDCIFormat1_2" in an RRC signaling.

In one embodiment, the second information block comprises all or partial fields in an IE "dl-DataToUL-ACK" and all or partial fields in an IE "dl-DataToUL-ACK-ForDCIFormat1_2" in an RRC signaling.

In one embodiment, the second information block comprises all or partial fields in an IE "dl-DataToUL-ACK-PTM" in an RRC signaling.

In one embodiment, the second information block comprises all or partial fields in an IE "dl-DataToUL-ACK-ForDCIFormat2_x1" in an RRC signaling, where x1 being a positive integer greater than 6.

In one embodiment, the first information block and the second information block respectively belong to two different IEs in a same RRC signaling.

In one embodiment, the first information block and the second information block respectively belong to two different fields in a same IE in a same RRC signaling.

In one embodiment, the first information block and the second information block respectively belong to two different RRC signalings.

In one embodiment, an expression of "the second information block being used to determine a first time-domain resource set" in the claim includes the following meaning: the second information block is used by the first node in the present disclosure to determine the first time-domain resource set.

In one embodiment, an expression of "the second information block being used to determine a first time-domain resource set" in the claim includes the following meaning: the second information block is used to indicate an SLIV, and the SLIV indicated by the second information block is used to determine the first time-domain resource set.

In one embodiment, an expression of "the second information block being used to determine a first time-domain resource set" in the claim includes the following meaning: the second information block is used to indicate a time offset between downlink data and uplink ACK/NACK, and the time offset between downlink data and uplink AC/NACK indicated by the second information block is used to determine the first time-domain resource set.

In one embodiment, an expression of "the second information block being used to determine a first time-domain resource set" in the claim includes the following meaning: the second information block is used to indicate a slot timing offset set $K_1$, and the slot timing offset set $K_1$ is used to determine the first time-domain resource set.

In one embodiment, an expression of "the second information block being used to determine a first time-domain resource set" in the claim includes the following meaning: the second information block indicates a length of a time interval between each time-domain resource block comprised in the first time-domain resource set and the first bit set.

In one embodiment, an expression of "the second information block being used to determine a first time-domain resource set" in the claim includes the following meaning: the second information indicates a length of a time interval between each time-domain resource block comprised in the first time-domain resource block comprised in the first time-domain resource set and a signal or channel carrying the first bit set; the second information block indicates a number of symbols and/or a number of slots comprised in each time-domain resource block comprised in the first time-domain resource set.

In one embodiment, an expression of "the second information block being used to determine a first time-domain resource set" in the claim includes the following meaning: the second information block indicates a number of slots and a number of symbols in a time-domain interval between each time-domain resource block comprised in the first time-domain resource set indicated by the second information block and a signal or channel carrying the first bit set; the second information block indicates a number of time-domain symbols and/or a number of slots comprised in each time-domain resource block comprised in the first time-domain resource set.

In one embodiment, an expression of "the second information block being used to determine a first time-domain resource set" in the claim includes the following meaning: the second information block indicates a number of slots and a number of symbols in a time-domain interval between an end time of each time-domain resource block comprised in the first time-domain resource set indicated by the second information block and a start time of a signal or channel carrying the first bit set; the second information block indicates a number of time-domain symbols and/or a number of slots comprised in each time-domain resource block comprised in the first time-domain resource set. In one subsidiary embodiment of the above embodiment, the symbol and the slot adopts a subcarrier spacing (SCS) of a subcarrier comprised in a signal or channel carrying the first bit set. In one subsidiary embodiment of the above embodiment, the symbol and the slot adopts an SCS of a subcarrier comprised in a PDSCH corresponding to the first bit set.

Embodiment 6

Embodiment 6 illustrates a schematic diagram of W signals according to one embodiment of the present disclosure, as shown in FIG. 6. In FIG. 6, the horizontal axis represents time, the slash-filled rectangle represents a target signal, the cross-line filled rectangle represents a PDCCH triggering a target signal, and each unfilled rectangle represents a signal other than a target signal in W signals.

In embodiment 6, the W bit sets in the present disclosure are respectively carried by W signals, and time-domain resources occupied by any two of the W signals are orthogonal; the W signals are respectively triggered by PDCCHs comprised in W control resource pools, and indexes of any two of the W control resource pools are unequal; one of the W signals carrying the first bit set in the present disclosure is a target signal, and the first control resource pool in the present disclosure is one of the W control resource pools comprising a PDCCH triggering the target signal.

In one embodiment, any of the W signals is a baseband signal.

In one embodiment, any of the W signals is a radio frequency signal.

In one embodiment, any of the W signals is transmitted through a PUSCH.

In one embodiment, any of the W signals is transmitted through a PUCCH.

In one embodiment, any of the W signals is transmitted through a PUSCH or through a PUCCH.

In one embodiment, there exists one of the W signals being transmitted through a PUSCH, and there exists one of the W signals being transmitted through a PUCCH.

In one embodiment, the W bit sets respectively belong to UCIs respectively carried by the W signals.

In one embodiment, the W bit sets are respectively used to generate the W signals.

In one embodiment, the W bit sets are respectively transmitted on the W signals.

In one embodiment, the W bit sets are respectively piggybacked by the W signals.

In one embodiment, one of the W bit sets is piggybacked by one of the W signals, and one of the W bit sets is used to generate one of the W signals.

In one embodiment, there do not exist overlapped time-domain resources in time-domain resources occupied by any two of the W signals.

In one embodiment, there does not exist a time-domain symbol in time domain being occupied by two of the W signals.

In one embodiment, there does not exist a time-domain symbol belonging to time-domain resources occupied by two of the W signals at the same time.

In one embodiment, time-domain resources occupied by any two of the W signals are different.

In one embodiment, any of the W control resource pools is a CORESET pool.

In one embodiment, any of the W control resource pool comprises at least one CORESET.

In one embodiment, any two of the W control resource pools are different.

In one embodiment, any of the W control resource pools is indexed.

In one embodiment, an expression of "the W signals being respectively triggered by a PDCCH comprised in W control resource pools" in the claim includes the following meanings: the W signals are respectively indicated PDCCHs comprised in the W control resource pools.

In one embodiment, an expression of "the W signals being respectively triggered by a PDCCH comprised in W control resource pools" in the claim includes the following meanings: time-domain resources respectively occupied by the W signals are respectively indicated by PDCCHs comprised in the W control resource pools.

In one embodiment, an expression of "the W signals being respectively triggered by a PDCCH comprised in W control resource pools" in the claim includes the following meanings: frequency-domain resources respectively occupied by the W signals are respectively indicated by PDCCHs comprised in the W control resource pools.

In one embodiment, an expression of "the W signals being respectively triggered by a PDCCH comprised in W control resource pools" in the claim includes the following meanings: the W signals respectively correspond to PDSCHs respectively scheduled by PDCCHs comprised in the W control resource pools.

In one embodiment, an expression of "the W signals being respectively triggered by a PDCCH comprised in W control resource pools" in the claim includes the following meanings: the W signals are respectively used to indicate whether PDSCHs respectively scheduled by PDCCHs comprised in the W control resource pools are correctly decoded.

In one embodiment, an expression of "the W signals being respectively triggered by a PDCCH comprised in W control resource pools" in the claim includes the following meanings: the W signals are respectively used to indicate whether W PDSCHs are correctly decoded, and PDCCHs comprised in the W control resource pools are respectively used to determine time-frequency resources occupied by the W PDSCHs.

In one embodiment, an expression of "the W signals being respectively triggered by a PDCCH comprised in W control resource pools" in the claim includes the following meanings: the W signals are used to respectively carry HARQ-ACK feedbacks of PDCCHs comprised in the W control resource pools.

In one embodiment, an expression of "the W signals being respectively triggered by a PDCCH comprised in W control resource pools" in the claim includes the following meanings: the W bit sets are respectively associated with the W control resource pools.

In one embodiment, one control resource pool comprising one PDCCH refers to that one control resource set comprised in the control resource pool comprises any CCE occupied by the PDCCH.

In one embodiment, one control resource pool comprising one PDCCH refers to that any CCE occupied by the PDCCH belongs to a control resource set comprised in the control resource pool.

In one embodiment, the target signal is transmitted through a PUCCH.

In one embodiment, the target signal is transmitted through a PUSCH.

In one embodiment, a bit comprised in the first bit set is used to generate the target signal.

In one embodiment, UCI carried by the target signal comprises the first bit set.

In one embodiment, the target signal piggybacks UCI comprising the first bit set.

In one embodiment, the target signal piggybacks the first bit set.

In one embodiment, one control resource set comprised in the first control resource pool comprises a PDCCH triggering the target signal.

In one embodiment, the first control resource pool is one of the W control resource pools.

In one embodiment, the first bit set comprises a HARQ-ACK bit of a PDSCH scheduled by a PDCCH triggering the target signal.

In one embodiment, the first bit set is used to determine whether a PDSCH scheduled by a PDCCH triggering the target signal is correctly decoded.

In one embodiment, a PDCCH triggering the target signal is a PDCCH used for semi-persistent release.

In one embodiment, the first bit set is used to determine whether a PDCCH triggering the target signal is detected.

In one embodiment, a PDCCH triggering the target signal is used to determine time-domain resources occupied by the target signal.

In one embodiment, a PDCCH triggering the target signal is used to determine frequency-domain resources occupied by the target signal.

In one embodiment, a PDCCH triggering the target signal is used to determine whether the target signal is transmitted.

In one embodiment, each CCE occupied by a PDCCH triggering the target signal belongs to a control resource set comprised in the first control resource pool.

In one embodiment, a search space set to which a PDCCH candidate occupied by a PDCCH triggering the target signal belongs and a control resource set comprised in the first control resource pool are associated.

In one embodiment, a PDCCH triggering the target signal comprises the first PDCCH.

In one embodiment, a PDCCH triggering the target signal does not comprise the first PDCCH.

In one embodiment, a number of PDCCHs triggering the target signal is equal to 1.

In one embodiment, a number of PDCCHs triggering the target signal is greater than 1.

Embodiment 7

Embodiment 7 illustrates a schematic diagram of X bit subsets according to one embodiment of the present disclosure, as shown in FIG. 7. In FIG. 7, each slash filled rectangle represents one of X bit subset, and cross-line filled figure with an arc top represents a serving cell comprised in one of X cell groups.

In embodiment 7, the X cell groups in the present disclosure are indexed in order, and at least one of the first search space set in the present disclosure or the first identifier in the present disclosure is used to determine an index of a cell group to which the first serving cell in the present disclosure belongs; the X bit subsets in the present disclosure are concatenated to generate the first bit set in the present disclosure, and an order of indexes of the X cell groups is used to determine a concatenation order of the X bit subsets.

In one embodiment, the X cell groups are indexed by consecutive integers starting from 0.

In one embodiment, an index of any of the X cell groups is a positive integer.

In one embodiment, an index of any of the X cell groups is a non-negative positive integer.

In one embodiment, an index of any of the X cell groups is an identifier of the cell group.

In one embodiment, the X cell groups are indexed in order according to a conditional relation.

In one embodiment, the X cell groups are indexed in order according to a magnitude relation of index values of comprised serving cells.

In one embodiment, an expression of "at least one of the first search space set or the first identifier is used to determine an index of a cell group to which the first serving cell belongs" in the claim includes the following meaning: at least one of the first search space set or the first identifier is used by the first node in the present disclosure to determine an index of a cell group to which the first serving cell belongs.

In one embodiment, an expression of "at least one of the first search space set or the first identifier is used to determine an index of a cell group to which the first serving cell belongs" in the claim includes the following meaning: at least one of the first search space set or the first identifier is used to determine an index of a cell group to which the first serving cell belongs out of indexes of the X cell groups.

In one embodiment, an expression of "at least one of the first search space set or the first identifier is used to determine an index of a cell group to which the first serving cell belongs" in the claim includes the following meaning: the first search space set and the first identifier are both used to determine an index of a cell group to which the first serving cell belongs.

In one embodiment, an expression of "at least one of the first search space set or the first identifier is used to determine an index of a cell group to which the first serving cell belongs" in the claim includes the following meaning: the first search space set is used to determine an index of a cell group to which the first serving cell belongs.

In one embodiment, an expression of "at least one of the first search space set or the first identifier is used to determine an index of a cell group to which the first serving cell belongs" in the claim includes the following meaning: the first identifier is used to determine an index of a cell group to which the first serving cell belongs.

In one embodiment, a type of the first search space set is used to determine an index of a cell group to which the first serving cell belongs.

In one embodiment, an index or identifier of the first search space set is used to determine an index of a cell group to which the first serving cell belongs.

In one embodiment, a DCI format adopted to monitor a control channel candidate comprised in the first search space set is used to determine an index of a cell group to which the first serving cell belongs.

In one embodiment, a target index is equal to an index of one of the X cell groups, and whether the first search space set is used to schedule groupcast or multicast traffic is used to determine whether an index of a cell group to which the first serving cell is equal to the target index.

In one embodiment, a target index is equal to an index of one of the X cell groups, and whether a DCI format adopted to monitor a control channel candidate comprised in the first search space set comprises a DCI format scheduling groupcast or multicast traffic is used to determine whether an index of a cell group to which the first serving cell belongs is equal to the target index.

In one embodiment, a target index is equal to an index of one of the X cell groups, and whether an RNTI adopted to monitor a control channel candidate comprised in the first search space set comprises an RNTI of groupcast or multicast traffic is used to determine whether an index of a cell group to which the first serving cell belongs is equal to the target index.

In one embodiment, the first search space set is used to determine an index of a cell group to which the first serving cell belongs according to a condition relation.

In one embodiment, a type of the first identifier is used to determine an index of a cell group to which the first serving cell belongs.

In one embodiment, the first identifier is an RNTI, an RNTI type to which the first identifier belongs is used to determine an index of a cell group to which the first serving cell belongs.

In one embodiment, a scope to which the first identifier belongs is used to determine an index of a cell group to which the first serving cell belongs.

In one embodiment, a target index is equal to an index of one of the X cell groups, and whether the first identifier is used for groupcast or multicast traffic is used to determine whether an index of a cell group to which the first serving cell is equal to the target index.

In one embodiment, a target index is equal to an index of one of the X cell groups, and whether the first identifier is used for groupcast or multicast traffic is used to determine whether an index of a cell group to which the first serving cell is equal to the target index.

In one embodiment, a target index is equal to an index of one of the X cell groups, and whether the first identifier is equal to a specific identifier is used to determine whether an index of a cell group to which the first serving cell belongs is equal to the target index. In one subsidiary embodiment of the above embodiment, the specific identifier is one of a G-RNTI, an M-RNTI, an SC-RNTI and an SC-N-RNTI. In one subsidiary embodiment of the above embodiment, the specific identifier is used for an RNTI of groupcast or broadcast traffic. In one subsidiary embodiment of the above embodiment, the specific identifier is used for an identifier of groupcast or broadcast traffic.

In one embodiment, a target index is equal to an index of one of the X cell groups, whether the first identifier belongs to a target identifier set is used to determine whether an index of a cell group to which the first serving cell belongs is equal to the target index, and the target identifier set comprises at least one identifier. In one subsidiary embodiment of the above embodiment, the target identifier set is predefined. In one subsidiary embodiment of the above embodiment, the target identifier set comprises an identifier used for groupcast or broadcast traffic. In one subsidiary embodiment of the above embodiment, the target identifier set is configurable. In one subsidiary embodiment of the above embodiment, the target identifier set is fixed.

In one embodiment, bits in the X bit subset are concatenated in order to obtain the first bit set.

In one embodiment, bits comprised in any of the X bit subsets are indexed in order, and bits comprised in any of the X bit subsets are arranged in order in the first bit set according to a concatenation order of the X bit subsets.

In one embodiment, bits comprised in any of the X bit subset are arranged in order, and bits comprised in two adjacent bit subsets among the X bit subsets are arranged end-to-end to generate the first bit set.

In one embodiment, bits in the X bit subsets are arranged according to a concatenation order of the X bit subsets to obtain the first bit set.

In one embodiment, an expression of "an order of indexes of the X cell groups being used to determine a concatenation order of the X bit subsets" in the claim includes the following meaning: an order of indexes of the X cell groups is used by the first node in the present disclosure to determine a concatenation order of the X bit subsets.

In one embodiment, an expression of "an order of indexes of the X cell groups being used to determine a concatenation sequence of the X bit subsets" in the claim includes the following meaning: the X bit subsets are concatenated according to indexes of corresponding cell groups in the X cell groups in an ascending order or a descending order.

In one embodiment, an expression of "an order of indexes of the X cell groups being used to determine a concatenation order of the X bit subsets" in the claim includes the following meaning: the X bit subsets are concatenated according to magnitude of indexes of corresponding cell groups in the X cell groups in an ascending order or a descending order.

In one embodiment, an expression of "an order of indexes of the X cell groups being used to determine a concatenation order of the X bit subsets" in the claim includes the following meaning: an order of any of the X bit subsets during concatenation is the same as an order of indexes of corresponding cell groups in the X cell groups.

In one embodiment, an expression of "an order of indexes of the X cell groups being used to determine a concatenation order of the X bit subsets" in the claim includes the following meaning: an order an index of any of the X cell groups in the X cell groups is used to determine a position of a corresponding bit subset in the X bit subsets in the first bit set.

Embodiment 8

Embodiment 8 illustrates a schematic diagram of a relation between a first time-domain resource set and a second time-domain resource set according to one embodiment of the present disclosure, as shown in FIG. 8. In FIG. 8, the horizontal axis represents time, in cases A and B, each slash filled rectangle represents the time-domain resource block comprised in a first time-domain resource set, each cross-line filled rectangle represents a time-domain resource block comprised in a second time-domain resource set, and the black-dot filled rectangle represents a first bit set; in case A, there do not exist fully or partially overlapped time-domain resource blocks between a first time-domain resource set and a second time-domain resource set; in case B, there exist fully or partially overlapped time-domain resource blocks between a first time-domain resource set and a second time-domain resource set.

In embodiment 8, the second information block in the present disclosure is used to determine a first time-domain resource set, and the first time-domain resource set comprises more than one time-domain resource blocks; the first PDCCH in the present disclosure is used to determine a target time-domain resource block, the target time-domain resource block belongs to a second time-domain resource set, and the second time-domain resource set comprises more than one time-domain resource blocks; whether there exist fully or partially overlapped time-domain resource blocks between the first time-domain resource set and the second time-domain resource set is used to determine the X cell groups in the present disclosure.

In one embodiment, each time-domain resource block comprised in the first time-domain resource set is a candidate PDSCH occasion.

In one embodiment, each time-domain resource block comprised in the first time-domain resource set is a potential PDSCH occasion.

In one embodiment, each time-domain resource block comprised in the first time-domain resource set is a candidate PDSCH occasion for feeding a HARQ-ACK back through the first bit set.

In one embodiment, each time-domain resource block comprised in the first time-domain resource set is a candidate PDSCH occasion corresponding to a HARQ-ACK comprised in the first bit set.

In one embodiment, each time-domain resource block comprised in the first time-domain resource set comprises at least one time-domain consecutive symbol.

In one embodiment, a time-domain resource block comprised in the first time-domain resource set comprises time-domain discrete symbols.

In one embodiment, an expression of "the first PDCCH being used to determine a target time-domain resource block" in the claim includes the following meaning: the first node in the present disclosure assumes that the first PDCCH is used to determine the target time-domain resource block.

In one embodiment, an expression of "the first PDCCH being used to determine a target time-domain resource block" in the claim includes the following meaning: DCI carried by the first PDCCH is used to determine the target time-domain resource block.

In one embodiment, an expression of "the first PDCCH being used to determine a target time-domain resource block" in the claim includes the following meaning: the first PDCCH is used to indicate a time interval between a start time of the target time-domain resource block and an end time of time-domain resources occupied by the first PDCCH.

In one embodiment, an expression of "the first PDCCH being used to determine a target time-domain resource block" in the claim includes the following meaning: the first PDCCH is used to indicate a number of slots and a number of symbols comprised in a time interval between a start time of the target time-domain resource block and an end time of time-domain resources occupied by the first PDCCH.

In one embodiment, each time-domain resource block comprised in the second time-domain resource set is a candidate PDSCH occasion.

In one embodiment, each time-domain resource block comprised in the second time-domain resource set is a candidate PDSCH occasion used for groupcast or multicast traffic.

In one embodiment, each time-domain resource block comprised in the second time-domain resource set is a candidate PDSCH occasion for feeding HARQ-ACK back through the first bit set.

In one embodiment, each time-domain resource block comprised in the second time-domain resource set is a candidate PDSCH occasion corresponding to a HARQ-ACK bit comprised in the first bit set.

In one embodiment, each time-domain resource block comprised in the second time-domain resource set comprises at least one time-domain consecutive symbol.

In one embodiment, a time-domain resource block comprised in the second time-domain resource set comprises time-domain discrete symbols.

In one embodiment, the first receiver receives a fifth information block, wherein the fifth information block is used to determine the second time-domain resource set. In one subsidiary embodiment of the above embodiment, a fifth information block and the second information block are two different IEs in a same RRC layer signaling. In one subsidiary embodiment of the above embodiment, a fifth information block and the second information block are two different fields in a same IE in a same RRC layer signaling. In one subsidiary embodiment of the above embodiment, a fifth information block and the second information block are two different RRC layer signalings. In one subsidiary embodiment of the above embodiment, the fifth information block is used to indicate an SLIV, and the SLIV indicated by the fifth information block is used to determine the second time-domain resource set. In one subsidiary embodiment of the above embodiment, the fifth information block is used to indicate a time offset between downlink data and an uplink ACK/NACK, and the time offset between the downlink data and the uplink AC/NACK indicated by the fifth information block is used to determine the second time-domain resource set. In one subsidiary embodiment of the above embodiment, the fifth information block comprises all or partial fields in an IE "PDSCH-TimeDomainAllocationListPTM" in an RRC signaling. In one subsidiary embodiment of the above embodiment, the fifth information block comprises all or partial fields in an IE "dl-DataToUL-ACK-PTM" in an RRC signaling. In one subsidiary embodiment of the above embodiment, the fifth information block comprises all or partial fields in an IE "dl-DataToUL-ACK-ForDCIFormat2_x1" in an RRC signaling, where x1 being a positive integer greater than 6.

In one embodiment, a type or an index of the first search space set is used to determine whether the second time-domain resource set and the first time-domain resource set are the same.

In one embodiment, a DCI format adopted to monitor the first control channel candidate is used to determine whether the second time-domain resource set and the first time-domain resource set are the same.

In one embodiment, the first identifier is used to determine whether the second time-domain resource set and the first time-domain resource set are the same.

In one embodiment, each time-domain resource block comprised in the first time-domain resource set is a candidate first-type PDSCH occasion, and each time-domain resource block comprised in the second time-domain resource set is a candidate second-type PDSCH occasion; the first-type PDSCH and the second-type PDSCH are different. In one subsidiary embodiment of the above embodiment, scrambling sequences of the first-type PDSCH and the second-type PDSCH are different. In one subsidiary embodiment of the above embodiment, initial values of scrambling sequence generators of the first-type PDSCH and the second-type PDSCH are different. In one subsidiary embodiment of the above embodiment, RNTIs corresponding to the first-type PDSCH and the second-type PDSCH are different. In one subsidiary embodiment of the above embodiment, the first-type PDSCH is used for UE-specific PDSCH, and the second-type PDSCH is used for a PDSCH for groupcast or broadcast traffic.

In one embodiment, any time-domain resource block comprised in the first time-domain resource set and any time-domain resource block comprised in the second time-domain resource set are different.

In one embodiment, there exists a same time-domain resource block between the first time-domain resource set and the second time-domain resource set.

In one embodiment, the target time-domain resource block is a time-domain resource block comprised in the second time-domain resource set.

In one embodiment, an expression of "whether there exist fully or partially overlapped time-domain resource blocks between the first time-domain resource set and the second time-domain resource set is used to determine the X cell groups" in the claim includes the following meaning: whether there exists an overlapped time-domain symbol between the first time-domain resource set and the second time-domain resource set is used to determine the X cell groups.

In one embodiment, an expression of "whether there exist fully or partially overlapped time-domain resource blocks between the first time-domain resource set and the second time-domain resource set is used to determine the X cell groups" in the claim includes the following meaning: whether there exist fully or partially overlapped time-domain resource blocks between the first time-domain resource set and the second time-domain resource set is used by the first node in the present disclosure to determine the X cell groups.

In one embodiment, an expression of "whether there exist fully or partially overlapped time-domain resource blocks between the first time-domain resource set and the second time-domain resource set is used to determine the X cell groups" in the claim includes the following meaning: whether there exist fully or partially overlapped time-domain resource blocks between the first time-domain resource set and the second time-domain resource set is used to determine X.

In one embodiment, an expression of "whether there exist fully or partially overlapped time-domain resource blocks between the first time-domain resource set and the second time-domain resource set is used to determine the X cell groups" in the claim includes the following meaning: when there do not exist fully or partially overlapped time-domain resource blocks between the first time-domain resource set and the second time-domain resource set, X being equal to 1; when there exist fully or partially overlapped time-domain resource blocks between the first time-domain resource set and the second time-domain resource set, X being equal to 2.

Embodiment 9

Embodiment 9 illustrates a schematic diagram of a first bit block according to one embodiment of the present disclosure, as shown in FIG. 9. In FIG. 9, the cross-line filled rectangle represents a first bit block, the slash filled thick rectangle represents a first bit subset, and the reticle filled rectangle represents a first time-domain occasion.

In embodiment 9, a first bit subset is one of the X bit subsets in the present disclosure, the first bit subset comprises a first bit block, the first bit block comprises at least one bit, and any bit comprised in the first bit block belongs to the first bit subset; the first bit block corresponds to a first time-domain occasion, the first time-domain occasion is a time-domain occasion comprised in a first occasion set, the first occasion set comprises at least one time-domain occasion, a position of the first time-domain occasion in the first occasion set is used to determine the first bit block in the first bit subset.

In one embodiment, the first bit subset comprises a bit other than the first bit block.

In one embodiment, a number of bits comprised in the first bit block is equal to 1.

In one embodiment, a number of bits comprised in the first bit block is greater than 1.

In one embodiment, the first bit block comprises a HARQ-ACK of a Transport Block (TB).

In one embodiment, the first bit block comprises a HARQ-ACK of a Code Block (CB).

In one embodiment, the first time-domain occasion is any time-domain occasion comprised in a first occasion set.

In one embodiment, the first time-domain occasion and the target time domain resource block in the present disclosure are the same.

In one embodiment, the first time-domain occasion and the target time-domain resource block in the present disclosure are different.

In one embodiment, the target time-domain resource block in the present disclosure is a time-domain occasion in the first occasion set.

In one embodiment, the target time-domain resource block in the present disclosure is a time-domain occasion other than the first occasion set.

In one embodiment, any time-domain occasion comprised in the first occasion set is a candidate PDSCH occasion.

In one embodiment, any time-domain occasion comprised in the first occasion set is a candidate PDSCH Reception Occasion.

In one embodiment, any time-domain occasion comprised in the first occasion set is a candidate PDSCH Reception Occasion corresponding to an SLV.

In one embodiment, any time-domain occasion comprised in the first occasion set is a candidate PDSCH Reception Occasion used for groupcast or broadcast traffic.

In one embodiment, the first occasion set corresponds to a PDSCH Time Domain Allocation List of groupcast or broadcast traffic.

In one embodiment, the first occasion set corresponds to a PDSCH Time Domain Allocation List.

In one embodiment, any time-domain occasion comprised in the first occasion set is a time-domain resource block comprised in the first time-domain resource set in the present disclosure.

In one embodiment, any time-domain occasion comprised in the first occasion set is a time-domain resource block comprised in the second time-domain resource set in the present disclosure.

In one embodiment, the first occasion set and the first time-domain resource set are equivalent, any time-domain occasion comprised in the first occasion set is a time-domain resource block comprised in the first time-domain resource set in the present disclosure, and any time-domain resource block comprised in the first time-domain resource set in the present disclosure is a time-domain occasion comprised in the first occasion set.

In one embodiment, the first occasion set and the second time-domain resource set are equivalent, any time-domain occasion comprised in the first occasion set is a time-domain resource block comprised in the second time-domain resource set in the present disclosure, and any time-domain resource block comprised in the second time-domain resource set in the present disclosure is a time-domain occasion comprised in the first occasion set.

In one embodiment, the first occasion set and the first time-domain resource set are different.

In one embodiment, the first occasion set and the second time-domain resource set are different.

In one embodiment, the first occasion set is a subset in the first time-domain resource set.

In one embodiment, the first occasion set is a subset in the second time-domain resource set.

In one embodiment, any time-domain occasion comprised in the first occasion set comprises at least one time-domain symbol.

In one embodiment, any two time-domain occasions comprised in the first occasion set belong to a same slot.

In one embodiment, time-domain symbols comprised in any two time-domain occasions comprised in the first occasion set belong to a same slot.

In one embodiment, all time-domain occasions comprised in the first occasion set belong to a same slot.

In one embodiment, two time-domain occasions comprised in the first occasion set respectively belong to different slots.

In one embodiment, an expression of "a position of the first time-domain occasion in the first occasion set being used to determine the first bit block out of the first bit subset" in the claim includes the following meaning: a position of the first time-domain occasion in the first occasion set is used by the first node in the present disclosure to determine the first bit block out of the first bit subset.

In one embodiment, an expression of "a position of the first time-domain occasion in the first occasion set being used to determine the first bit block out of the first bit subset" in the claim includes the following meaning: a position of the first time-domain occasion in the first occasion set is used to determine a position of the first bit block in the first bit subset out of the first bit subset.

In one embodiment, an expression of "a position of the first time-domain occasion in the first occasion set being used to determine the first bit block out of the first bit subset" in the claim includes the following meaning: a position of the first time-domain occasion in the first occasion set is used to determine an index of a bit comprised in the first bit block in the first bit subset out of the first bit subset.

In one embodiment, an expression of "a position of the first time-domain occasion in the first occasion set being used to determine the first bit block out of the first bit subset" in the claim includes the following meaning: a position of the first time-domain occasion in the first occasion set is used to determine a position of the first bit block in the first bit subset out of the first bit subset according to a Type1 HARQ-ACK codebook.

In one embodiment, an expression of "a position of the first time-domain occasion in the first occasion set being used to determine the first bit block out of the first bit subset" in the claim includes the following meaning: a position of the first time-domain occasion in the first occasion set is used to determine a position of the first bit block in the first bit subset out of the first bit subset according to a Pseudo-Code.

In one embodiment, an expression of "a position of the first time-domain occasion in the first occasion set being used to determine the first bit block out of the first bit subset" in the claim includes the following meaning: a position of the first time-domain occasion in the first occasion set is used to determine a position of the first bit block in the first bit subset out of the first bit subset according to counting logic.

In one embodiment, a position of the first time-domain occasion in the first occasion set includes an index of the first time-domain occasion in the first occasion set.

In one embodiment, time-domain occasions comprised in the first occasion set are indexed according to start time in an ascending order or a descending order, and a position of the first time-domain occasion in the first occasion set includes an index of the first time-domain occasion in the first occasion set.

In one embodiment, time-domain occasions comprised in the first occasion set are indexed according to end time in an ascending order or a descending order, and a position of the first time-domain occasion in the first occasion set includes an index of the first time-domain occasion in the first occasion set.

Embodiment 10

Embodiment 10 illustrates a schematic diagram of M occasion sets according to one embodiment of the present disclosure, as shown in FIG. 10. In FIG. 10, the second left column to the fourth left column represent one of the M occasion sets, and the fifth left column to the seventh left column represent another one of the M occasion sets; $d_i(j)$ represents a number of slots comprised in a time interval between a corresponding time-domain occasion and a scheduled PDCCH, and $S_i(j)$ and $L_i(j)$ respectively represent a start symbol and a length of a time-domain occasion (represented in a number of symbols) in an SLIV of a corresponding time-domain occasion. M=2 in the embodiment does not limit the case that M being greater than 2 is supported in the present disclosure.

In embodiment 10, the first occasion set in the present disclosure is one of M occasion sets, and any of the M occasion sets comprises at least one time-domain occasion, M being a positive integer; when M is greater than 1, at least one of the first search space set in the present disclosure or the first identifier in the present disclosure is used to determine the first occasion set out of the M occasion sets.

In one embodiment, M is equal to one of 2, 3, 4 and 5.

In one embodiment, M is greater than 5.

In one embodiment, all time-domain occasions comprised in any of the M occasion sets belong to a plurality of same slots.

In one embodiment, all time-domain occasions comprised in any of the M occasion sets belong to a same slot.

In one embodiment, any time-domain occasion comprised in any of the M occasion sets is a candidate PDSCH occasion.

In one embodiment, any time-domain occasion comprised in any of the M occasion sets is a candidate PDSCH reception occasion.

In one embodiment, any time-domain occasion comprised in any of the M occasion sets is a candidate PDSCH reception occasion corresponding to an SLIV.

In one embodiment, any time-domain occasion comprised in any of the M occasion sets is PDSCH time-domain resources that can be configured by a PDSCH time-domain resource allocation.

In one embodiment, any time-domain occasion comprised in any of the M occasion sets is a candidate PDSCH reception occasion corresponding to a group of $K_0$ and SLIV.

In one embodiment, any time-domain occasion comprised in any of the M occasion sets is a time-domain resource block comprised in the first time-domain resource set in the present disclosure or a time-domain resource block comprised in the second time-domain resource set in the present disclosure.

In one embodiment, any time-domain occasion comprised in any of the M occasion sets comprises at least one time-domain symbol.

In one embodiment, there exist two time-domain occasions comprised in one of the M occasion sets respectively belonging to different slots.

In one embodiment, the M occasion sets respectively correspond to M PDSCH Time Domain Allocation Lists.

In one embodiment, there exists one of the M occasion sets corresponding to a PDSCH time-domain allocation list of groupcast or broadcast traffic.

In one embodiment, the second information block in the present disclosure is used to determine the M occasion sets.

In one embodiment, the second information block in the present disclosure is used to determine M PDSCH time-domain allocation lists, and the M PDSCH time-domain allocation lists are respectively used to determine the M occasion sets. In one subsidiary embodiment of the above embodiment, the second information block comprises M information sub-blocks, and the M information sub-blocks are used to respectively indicate the M PDSCH time-domain allocation lists.

In one embodiment, a sixth information block is used to determine the M occasion sets, and the sixth information block belongs to an RRC layer signaling. In one subsidiary embodiment of the above embodiment, the sixth information block and the second information block in the present disclosure respectively belong to two different RRC layer signalings. In one subsidiary embodiment of the above embodiment, the sixth information block and the second information block in the present disclosure respectively belong to two different IEs in a same RRC layer signaling. In one subsidiary embodiment of the above embodiment, the sixth information block and the second information block in the present disclosure respectively belong to two different fields in a same IE in an RRC layer signaling. In one subsidiary embodiment of the above embodiment, the sixth information block comprises M information sub-blocks, and the M information sub-blocks are respectively used to determine the M occasion sets.

In one embodiment, when a first configuration block is provided, the first occasion set is an occasion set configured by the first configuration information block; when the first configuration information block is not provided and a second configuration information block is provided, the first occasion set is an occasion set configured by the second configuration information block; when neither the first configuration information block nor the second configuration information block is provided and the third configuration information block is provided, the first occasion set is an occasion set configured by the third configuration information block; when the first configuration information block, the second configuration information block and the third configuration information block are not provided, the first occasion set is a default occasion set; the first configuration information block is an IE or field in an RRC signaling, the second configuration information block is an IE or field in an RRC signaling, and the third configuration information block is an IE or a field in an RRC signaling. In one subsidiary embodiment of the above embodiment, any two configuration information blocks among the first configuration information block, the second configuration information block and the third configuration information block are different. In one subsidiary embodiment of the above embodiment, the first configuration information block and the second configuration information block are UE dedicated, and the third configuration information block is common. In one subsidiary embodiment of the above embodiment, the first configuration information block and the second configuration information block are two different IEs or fields in a same RRC signaling, and the third configuration information block and the first configuration information block respectively belong to two different RRC signalings. In one subsidiary embodiment of the above embodiment, the first configuration information block comprises "pdsch-TimeDomainAllocationListForPTM" in "pdsch-Config", the second configuration information block comprises "pdsch-TimeDomainAllocationList" in "pdsch-Config", and the third information block comprises "pdsch-TimeDomainAllocationList" in "pdsch-ConfigCommon". In one subsidiary embodiment of the above embodiment, the first configuration information block comprises "pdsch-TimeDomainAllocationList-DCI-2-x1-r17" in "pdsch-Config", the second configuration information block comprises "pdsch-TimeDomainAllocationList" in "pdsch-Config", and the third information block comprises "pdsch-TimeDomain-AllocationList" in "pdsch-ConfigCommon", X being a positive integer greater than 6.

In one embodiment, an expression of "at least one of the first search space set or the first identifier being used to determine the first occasion set out of the M occasion sets" in the claim includes the following meaning: at least one of the first search space set or the first identifier is used by the first node in the present disclosure to determine the first occasion set out of the M occasion sets.

In one embodiment, an expression of "at least one of the first search space set or the first identifier being used to determine the first occasion set out of the M occasion sets" in the claim includes the following meaning: a type of the first search space set is used to determine the first occasion set out of the M occasion sets.

In one embodiment, an expression of "at least one of the first search space set or the first identifier being used to determine the first occasion set out of the M occasion sets" in the claim includes the following meaning: a DCI format comprised in the first search space set is used to determine the first occasion set out of the M occasion sets.

In one embodiment, an expression of "at least one of the first search space set or the first identifier being used to determine the first occasion set out of the M occasion sets" in the claim includes the following meaning: a type of the first identifier is used to determine the first occasion set out of the M occasion sets.

In one embodiment, an expression of "at least one of the first search space set or the first identifier being used to determine the first occasion set out of the M occasion sets" in the claim includes the following meaning: a value range of the first identifier is used to determine the first occasion set out of the M occasion sets.

Embodiment 11

Figure 11:
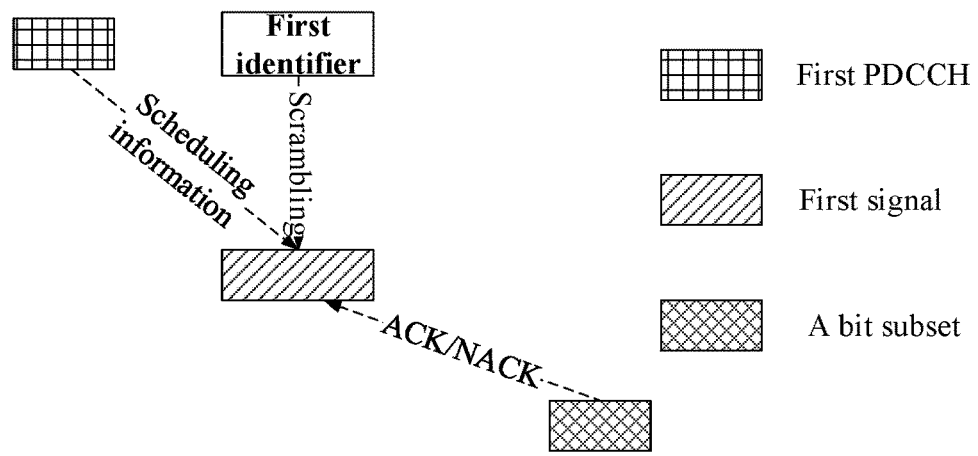
FIG. 11 illustrates a schematic diagram of a first signal according to one embodiment of the present disclosure.

Embodiment 11 illustrates a schematic diagram of a first signal according to one embodiment of the present disclosure, as shown in FIG. 11. In FIG. 11, the slash filled rectangle represents a first signal, the reticle filled rectangle represents a first PDCCH, and the cross-line filled rectangle represents one of X bit subsets indicating whether a first signal is correctly received.

In embodiment 11, the first PDCCH in the present disclosure is used to determine time-frequency resources occupied by the first signal in the present disclosure; the first identifier in the present disclosure is used for a scrambling sequence of the first signal, the first signal belongs to the first serving cell in the present disclosure, and one of the X bit subsets in the present disclosure is used to indicate whether the first signal is correctly received; the third information block in the present disclosure is used to indicate that the first node supports the X being greater than 1.

In one embodiment, the first signal is a baseband signal.

In one embodiment, the first signal is a radio frequency signal.

In one embodiment, the first signal is transmitted via a Uu interface.

In one embodiment, the first signal is transmitted via a PC5 interface.

In one embodiment, a transmitter of the first signal comprises the second node in the present disclosure.

In one embodiment, the first signal is transmitted through a Downlink Shared Channel (DL-SCH).

In one embodiment, the first signal is transmitted through a Physical Downlink Shared Channel (PDSCH).

In one embodiment, the first signal is Groupcast/Multicast.

In one embodiment, the first signal is unicast.

In one embodiment, the first signal is transmitted through a Physical Multicast Channel (PMCH).

In one embodiment, the first signal is used to transmit a Multicast Control Channel (MCCH).

In one embodiment, the first signal is used to transmit a Multicast Traffic Channel (MTCH).

In one embodiment, the first signal is used to transmit a Single Cell Multicast Control Channel (SC-MCCH).

In one embodiment, the first signal is used to transmit a Single Cell Multicast Traffic Channel (SC-MTCH).

In one embodiment, all or partial bits in a Transport Block (TB) are used to generate the first signal.

In one embodiment, the first signal is used to carry all or partial bits in a Transport Block (1B).

In one embodiment, all or partial bits in a Code Block Group (CBG) are used to generate the first signal.

In one embodiment, the first signal belongs to an initial transmission of a Hybrid Automatic Repeat Request (HARQ) process.

In one embodiment, the first signal belongs to a re-transmission of a Hybrid Automatic Repeat Request (HARQ) process.

In one embodiment, the first signal is transmitted through a Semi-Persistent Scheduling (SPS) PDSCH.

In one embodiment, the first signal comprises a reference signal.

In one embodiment, the first signal comprises a Shared Channel (SCH) and a reference signal.

In one embodiment, the first signal occupies the target time-domain resource block in the present disclosure.

In one embodiment, the third information block is transmitted via an air interface.

In one embodiment, the third information block is transmitted via a radio interface.

In one embodiment, the third information block comprises all or part of a higher-layer signaling.

In one embodiment, the third information block comprises all or part of a physical-layer signaling.

In one embodiment, the third information block is earlier than the first information block.

In one embodiment, the third information block is later than the first information block.

In one embodiment, the third information block comprises all or part of an RRC signaling.

In one embodiment, the third information block comprises all or part of a MAC layer signaling.

In one embodiment, the third information block is transmitted through a Physical Uplink Shared CHannel (PUSCH).

In one embodiment, the third information block is transmitted through a Physical Uplink Control Channel.

In one embodiment, the third information block comprises Uplink Control Information (UCI).

In one embodiment, the third information block is used to indicate a capability of the first node in the present disclosure.

In one embodiment, an expression of "the third information block being used to indicate that the first node supports X being greater than 1" in the claim includes the following meaning: the third information block is used by the first node in the present disclosure to indicate that the first node supports X being greater than 1.

In one embodiment, an expression of "the third information block being used to indicate that the first node supports X being greater than 1" in the claim includes the following meaning: the third information block is used to explicitly indicate that the first node supports the X being greater than 1.

In one embodiment, an expression of "the third information block being used to indicate that the first node supports X being greater than 1" in the claim includes the following meaning: the third information block is used to implicitly indicate that the first node supports the X being greater than 1.

In one embodiment, an expression of "the third information block being used to indicate that the first node supports X being greater than 1" in the claim includes the following meaning: the third information block indicates that the first node supports two PDSCH Frequency Division Multiplexings (FDMs).

In one embodiment, an expression of "the third information block being used to indicate that the first node supports X being greater than 1" in the claim includes the following meaning: the third information block is used to indicate that the first node supports two PDSCH FDMs, and the first node supporting two PDSCH FDMs is used to determine that the first node supports X being greater than 1.

In one embodiment, an expression of "the third information block being used to indicate that the first node supports X being greater than 1" in the claim includes the following meaning: the third information block is used to indicate that the first node supports a FDM between a unicast PDSCH and a groupcast or broadcast PDSCH.

In one embodiment, an expression of "the third information block being used to indicate that the first node supports X being greater than 1" in the claim includes the following meaning: the third information block is used to indicate that there exist fully or partially overlapped time-domain symbols in time domain between a unicast PDSCH or a groupcast or broadcast PDSCH.

In one embodiment, an expression of "the third information block being used to indicate that the first node supports X being greater than 1" in the claim includes the following meaning: the third information block is used to indicate that the first node supports that there exist fully or partially overlapped time-domain symbols in time domain between a unicast PDSCH and a groupcast or broadcast PDSCH, and the first node supports that there exist fully or partially overlapped time-domain symbols in time domain between a unicast PDSCH and a groupcast or broadcast PDSCH being used to determine that the first node supports X being greater than 1.

In one embodiment, an expression of "the first PDCCH being used to determine time-frequency resources occupied by the first signal" in the claim includes the following meaning: the first PDCCH is used by the first node in the present disclosure to determine time-frequency occupied by the first signal.

In one embodiment, an expression of "the first PDCCH being used to determine time-frequency resources occupied by the first signal" in the claim includes the following meaning: the first PDCCH is used to indicate time-frequency resources occupied by the first signal.

In one embodiment, an expression of "the first PDCCH being used to determine time-frequency resources occupied by the first signal" in the claim includes the following meaning: a DCI format carried by the first PDCCH is used to indicate time-frequency resources occupied by the first signal.

In one embodiment, an expression of "the first PDCCH being used to determine time-frequency resources occupied by the first signal" in the claim includes the following meaning: two fields comprised in a DCI format carried by the first PDCCH are used to respectively indicate time-domain resources and frequency-domain resources occupied by the first signal.

In one embodiment, an expression of "the first identifier being used for a scrambling sequence of the first signal" in the claim includes the following meaning: the first identifier is used to generate a scrambling sequence for the first signal.

In one embodiment, an expression of "the first identifier being used for a scrambling sequence of the first signal" in the claim includes the following meaning: the first identifier is used to initialize a scrambling sequence generator of the first signal.

In one embodiment, an expression of "the first identifier being used for a scrambling sequence of the first signal" in the claim includes the following meaning: the first identifier is used to calculate an initial value of a generating register of a scrambling sequence of the first signal.

In one embodiment, an expression of "the first signal belongs to the first serving cell" in the claim includes the following meaning: frequency-domain resources occupied by the first signal belong to a carrier corresponding to the first serving cell.

In one embodiment, an expression of "the first signal belongs to the first serving cell" in the claim includes the following meaning: frequency-domain resources occupied by the first signal belong to a BWP comprised in the first serving cell.

In one embodiment, an expression of "the first signal belongs to the first serving cell" in the claim includes the following meaning: an ID of the first serving cell is used to initialize a generator of a scrambling sequence of the first signal.

In one embodiment, one of the X bit subsets is used to indicate a HARQ-ACK of the first signal.

In one embodiment, one of the X bit subsets is used to indicate a HARQ-ACK of the first signal, and one of the X bit subsets indicating a HARQ-ACK of the first signal also comprises a bit other than a HARQ-ACK of the first signal.

In one embodiment, one of the X bit subsets is used to indicate a HARQ-ACK of the first signal, and one of the X bit subsets indicating a HARQ-ACK of the first signal only comprises a HARQ-ACK bit of the first signal.

In one embodiment, at least one of the first search space set or the first identifier is used to determine a bit subset indicating whether the first signal is correctly received out of the X bit subsets.

In one embodiment, a type or index of the first search space set is used to determine a target cell group out of the X cell groups, the first serving cell belongs to a target cell group, and one of the X bit subsets for the target cell group is used to indicate whether the first signal is correctly received.

In one embodiment, a DCI format carried by the first PDCCH is used to determine a target cell group out of the X cell groups, the first serving cell belongs to a target cell group, and one of the X bit subsets for the target cell group is used to indicate whether the first signal is correctly received.

In one embodiment, an RNTI adopted by a DCI format carried by the first PDCCH is used to determine a bit subset indicating whether the first signal is correctly received out of the X bit subsets.

In one embodiment, the first identifier is used to determine a target cell group out of the X cell groups, the first serving cell belongs to a target cell group, and one of the X bit subsets for the target cell group is used to indicate whether the first signal is correctly received.

In one embodiment, a type of the first identifier is used to determine a bit subset indicating whether the first signal is correctly received out of the X bit subsets.

In one embodiment, a value range of the first identifier is used to determine a bit subset indicating whether the first signal is correctly received out of the X bit subsets.

In one embodiment, an index of a bit subset indicating whether the first signal is correctly received in the X bit subsets is explicitly configured.

Embodiment 12

Figure 12:
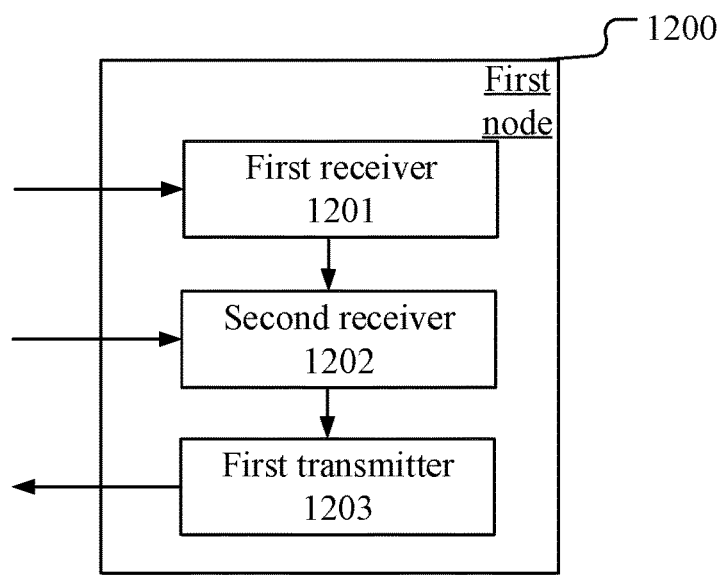
FIG. 12 illustrates a structure block diagram of a processing device in a first node according to one embodiment of the present disclosure.

Embodiment 12 illustrates the structure diagram of a processing device in a first node, as shown in FIG. 12. In FIG. 12, a processing device 1200 of a first node includes a first receiver 1201, a second receiver 1202 and a first transmitter 1203. The first receiver 1201 comprises the transmitter/receiver 456 (including the antenna 460), the receiving processor 452 and the controller/processor 490 in FIG. 4 of the present disclosure; the second receiver 1202 comprises the transmitter/receiver 456 (including the antenna 460), the receiving processor 452 and the controller/processor 490 in FIG. 4 of the present disclosure; the first transmitter 1203 comprises the transmitter/receiver 456 (including the antenna 460) and the transmitting processor 455 in FIG. 4 of the present disclosure.

In embodiment 12, the first receiver 1201 receives a first information block; the second receiver 1202 receives a first PDCCH, a control channel candidate occupied by the first PDCCH belongs to a first search space set; and a first transmitter 1203 transmits W bit sets, the first information block is used to determine the W bit sets, each of the W bit sets comprises at least one HARQ-ACK bit, W being a positive integer greater than 1; herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

In one embodiment, the W bit sets are respectively carried by W signals, and time-domain resources occupied by any two of the W signals are orthogonal; the W signals are respectively triggered by PDCCHs comprised in W control resource pools, and indexes of any two of the W control resource pools are unequal; one of the W signals carrying the first bit set is a target signal, and the first control resource pool is one of the W control resource pools comprising a PDCCH triggering the target signal.

In one embodiment, the X cell groups are indexed in order, and at least one of the first search space set or the first identifier is used to determine an index of a cell group to which the first serving cell belongs; the X bit subsets are concatenated to generate the first bit set, and an order of indexes of the X cell groups is used to determine a concatenation order of the X bit subsets.

In one embodiment, the first receiver 1201 receives a second information block, herein, the second information block is used to determine a first time-domain resource set, and the first time-domain resource set comprises more than one time-domain resource blocks; the first PDCCH is used to determine a target time-domain resource block, the target time-domain resource block belongs to a second time-domain resource set, and the second time-domain resource set comprises more than one time-domain resource blocks; whether there exist fully or partially overlapped time-domain resource blocks between the first time-domain resource set and the second time-domain resource set is used to determine the X cell groups.

In one embodiment, a first bit subset is one of the X bit subsets, the first bit subset comprises a first bit block, the first bit block comprises at least one bit, and any bit comprised in the first bit block belongs to the first bit subset; the first bit block corresponds to a first time-domain occasion, the first time-domain occasion is a time-domain occasion comprised in a first occasion set, the first occasion set comprises at least one time-domain occasion, and a position of the first time-domain occasion in the first occasion set is used to determine the first bit block in the first bit subset.

In one embodiment, the first occasion set is one of M occasion sets, and any of the M occasion sets comprises at least one time-domain occasion, M being a positive integer; when M is greater than 1, at least one of the first search space set or the first identifier is used to determine the first occasion set out of the M occasion sets.

In one embodiment, the second receiver 1202 receives a first signal, and the first transmitter 1203 transmits a third information block; herein, the first PDCCH is used to determine time-frequency resources occupied by the first signal; the first identifier is used for a scrambling sequence of the first signal, the first signal belongs to the first serving cell, and one of the X bit subsets is used to indicate whether the first signal is correctly received; and the third information block is used to indicate that the first node supports X being greater than 1.

Embodiment 13

Figure 13:
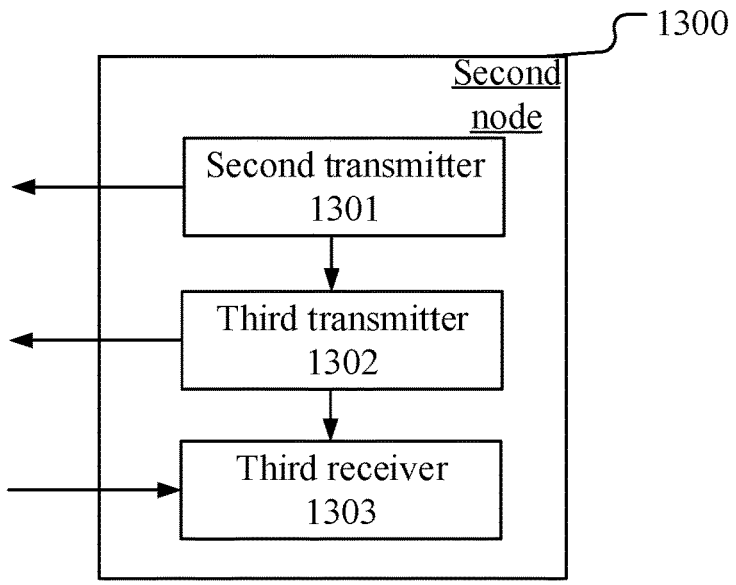
FIG. 13 illustrates a structure block diagram of a processing device in second node according to one embodiment of the present disclosure.

Embodiment 13 illustrates a structure diagram of a processing device in a second node, as shown in FIG. 13. In FIG. 13, a processing device 1300 of the second node comprises a second transmitter 1301, a third transmitter 1302 and a third receiver 1303. The second transmitter 1301 comprises the transmitter/receiver 416 (including the antenna 460), the transmitting processor 415 and the controller/processor 440 in FIG. 4 of the present disclosure; the third transmitter 1302 comprises the transmitter/receiver 416 (including the antenna 460), the transmitting processor 415 and the controller/processor 440 in FIG. 4 of the present disclosure; and the third receiver 1303 comprises the transmitter/receiver 416 (including the antenna 460) and the receiving processor 412 in FIG. 4 of the present disclosure.

In Embodiment 13, the second transmitter 1301 transmits a first information block; a third transmitter 1302 transmits a first PDCCH, a control channel candidate occupied by the first PDCCH belongs to a first search space set; and a third receiver 1303 receives W bit sets, the first information block is used to indicate the W bit sets, each of the W bit sets comprises at least one HARQ-ACK bit, W being a positive integer greater than 1; herein, the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

In one embodiment, the W bit sets are respectively carried by W signals, and time-domain resources occupied by any two of the W signals are orthogonal; the W signals are respectively triggered by PDCCHs comprised in W control resource pools, and indexes of any two of the W control resource pools are unequal; one of the W signals carrying the first bit set is a target signal, and the first control resource pool is one of the W control resource pools comprising a PDCCH triggering the target signal.

In one embodiment, the X cell groups are indexed in order, and at least one of the first search space set or the first identifier is used to determine an index of a cell group to which the first serving cell belongs; the X bit subsets are concatenated to generate the first bit set, and an order of indexes of the X cell groups is used to determine a concatenation order of the X bit subsets.

In one embodiment, the second transmitter 1301 transmits a second information block; herein, the second information block is used to indicate a first time-domain resource block, and the first time-domain resource set comprises more than one time-domain resource blocks; the first PDCCH is used to determine a target time-domain resource block, the target time-domain resource block belongs to a second time-domain resource set, and the second time-domain resource set comprises more than one time-domain resource blocks; whether there exist fully or partially overlapped time-domain resource blocks between the first time-domain resource set and the second time-domain resource set is used to determine the X cell groups.

In one embodiment, a first bit subset is one of the X bit subsets, the first bit subset comprises a first bit block, the first bit block comprises at least one bit, and any bit comprised in the first bit block belongs to the first bit subset; the first bit block corresponds to a first time-domain occasion, the first time-domain occasion is a time-domain occasion comprised in a first occasion set, the first occasion set comprises at least one time-domain occasion, and a position of the first time-domain occasion in the first occasion set is used to determine the first bit block in the first bit subset.

In one embodiment, the first occasion set is one of M occasion sets, and any of the M occasion sets comprises at least one time-domain occasion, M being a positive integer; when M is greater than 1, at least one of the first search space set or the first identifier is used to determine the first occasion set out of the M occasion sets.

In one embodiment, the third transmitter 1302 transmits a first signal; the third receiver 1303 receives a third information block; herein, the first PDCCH is used to determine time-frequency resources occupied by the first signal; the first identifier is used for a scrambling sequence of the first signal, the first signal belongs to the first serving cell, and one of the X bit subsets is used to indicate whether the first signal is correctly received; the third information block is used to indicate that a transmitting device of the third information block supports X being greater than 1.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, test device, test equipment, test instrument and other wireless communication devices. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations, test device, test equipment, test instrument and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first information block;
a second receiver, receiving a first PDCCH, a control channel candidate occupied by the first PDCCH belonging to a first search space set; and
a first transmitter, transmitting W bit sets, the first information block being used to determine the W bit sets, each of the W bit sets comprising at least one HARQ-ACK bit, W being a positive integer greater than 1;
wherein the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

2. The first node according to claim 1, wherein the W bit sets are respectively carried by W signals, and time-domain resources occupied by any two of the W signals are orthogonal; the W signals are respectively triggered by PDCCHs comprised in W control resource pools, and indexes of any two of the W control resource pools are unequal; one of the W signals carrying the first bit set is a target signal, and the first control resource pool is one of the W control resource pools comprising a PDCCH triggering the target signal.

3. The first node according to claim 1, wherein the X cell groups are indexed in order, and at least one of the first search space set or the first identifier is used to determine an index of a cell group to which the first serving cell belongs; the X bit subsets are concatenated to generate the first bit set, and an order of indexes of the X cell groups is used to determine a concatenation order of the X bit subsets.

4. The first node according to claim 1, wherein the first receiver receives a second information block, wherein the second information block is used to determine a first time-domain resource set, and the first time-domain resource set comprises more than one time-domain resource blocks; the first PDCCH is used to determine a target time-domain resource block, the target time-domain resource block belongs to a second time-domain resource set, and the second time-domain resource set comprises more than one time-domain resource blocks; whether there exist fully or partially overlapped time-domain resource blocks between the first time-domain resource set and the second time-domain resource set is used to determine the X cell groups.

5. The first node according to claim 1, wherein a first bit subset is one of the X bit subsets, the first bit subset comprises a first bit block, the first bit block comprises at least one bit, and any bit comprised in the first bit block belongs to the first bit subset; the first bit block corresponds to a first time-domain occasion, the first time-domain occasion is a time-domain occasion comprised in a first occasion set, the first occasion set comprises at least one time-domain occasion, and a position of the first time-domain occasion in the first occasion set is used to determine the first bit block in the first bit subset.

6. The first node according to claim 5, wherein the first occasion set is one of M occasion sets, and any of the M occasion sets comprises at least one time-domain occasion, M being a positive integer; when M is greater than 1, at least one of the first search space set or the first identifier is used to determine the first occasion set out of the M occasion sets.

7. The first node according to claim 1, wherein the second receiver receives a first signal, and the first transmitter transmits a third information block; wherein the first PDCCH is used to determine time-frequency resources occupied by the first signal; the first identifier is used for a scrambling sequence of the first signal, the first signal belongs to the first serving cell, and one of the X bit subsets is used to indicate whether the first signal is correctly received; and the third information block is used to indicate that the first node supports X being greater than 1.

8. A second node for wireless communications, comprising:
a second transmitter, transmitting a first information;
a third transmitter, transmitting a first PDCCH, a control channel candidate occupied by the first PDCCH belonging to a first search space set; and
a third receiver, receiving W bit sets, the first information block being used to indicate the W bit sets, each of the W bit sets comprising at least one HARQ-ACK bit, W being a positive integer greater than 1;
wherein the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

9. The second node according to claim 8, wherein the W bit sets are respectively carried by W signals, and time-domain resources occupied by any two of the W signals are orthogonal; the W signals are respectively triggered by PDCCHs comprised in W control resource pools, and indexes of any two of the W control resource pools are unequal; one of the W signals carrying the first bit set is a target signal, and the first control resource pool is one of the W control resource pools comprising a PDCCH triggering the target signal.

10. The second node according to claim 8, wherein the X cell groups are indexed in order, and at least one of the first search space set or the first identifier is used to determine an index of a cell group to which the first serving cell belongs; the X bit subsets are concatenated to generate the first bit set, and an order of indexes of the X cell groups is used to determine a concatenation order of the X bit subsets.

11. The second node according to claim 8, wherein the second transmitter transmits a second information block; wherein the second information block is used to indicate a first time-domain resource block, and the first time-domain resource set comprises more than one time-domain resource blocks; the first PDCCH is used to determine a target time-domain resource block, the target time-domain resource block belongs to a second time-domain resource set, and the second time-domain resource set comprises more than one time-domain resource blocks; whether there exist fully or partially overlapped time-domain resource blocks between the first time-domain resource set and the second time-domain resource set is used to determine the X cell groups.

12. The second node according to claim 8, wherein a first bit subset is one of the X bit subsets, the first bit subset comprises a first bit block, the first bit block comprises at least one bit, and any bit comprised in the first bit block belongs to the first bit subset; the first bit block corresponds to a first time-domain occasion, the first time-domain occasion is a time-domain occasion comprised in a first occasion set, the first occasion set comprises at least one time-domain occasion, and a position of the first time-domain occasion in the first occasion set is used to determine the first bit block in the first bit subset; the first occasion set is one of M occasion sets, and any of the M occasion sets comprises at least one time-domain occasion, M being a positive integer; when M is greater than 1, at least one of the first search space set or the first identifier is used to determine the first occasion set out of the M occasion sets.

13. The second node according to claim 8, wherein the third transmitter transmits a first signal; the third receiver receives a third information block; wherein the first PDCCH is used to determine time-frequency resources occupied by the first signal; the first identifier is used for a scrambling sequence of the first signal, the first signal belongs to the first serving cell, and one of the X bit subsets is used to indicate whether the first signal is correctly received; and the third information block is used to indicate that a transmitting device of the third information block supports X being greater than 1.

14. A method in a first node for wireless communications, comprising:
receiving a first information block;
receiving a first PDCCH, a control channel candidate occupied by the first PDCCH belonging to a first search space set; and
transmitting W bit sets, the first information block being used to determine the W bit sets, each of the W bit sets comprising at least one HARQ-ACK bit, W being a positive integer greater than 1;
wherein the first search space set is associated with a first control resource set, the first control resource set belongs to a first control resource pool, and the first control resource pool comprises at least one control resource set; the first control resource pool is used to determine a first bit set out of the W bit sets, the first bit set comprises X bit subsets, X being a positive integer greater than 1; the X bit subsets are respectively for X cell groups, and any of the X cell groups comprises at least one serving cell; the first PDCCH is used for a first serving cell, and the first serving cell belongs to one or a plurality of cell groups among the X cell groups; the first PDCCH is used to determine a first identifier, and at least one of the first search space set or the first identifier is used to determine a cell group to which the first serving cell belongs out of the X cell groups.

15. The method in a first node according to claim 14, wherein the W bit sets are respectively carried by W signals, and time-domain resources occupied by any two of the W signals are orthogonal; the W signals are respectively triggered by PDCCHs comprised in W control resource pools, and indexes of any two of the W control resource pools are unequal; one of the W signals carrying the first bit set is a target signal, and the first control resource pool is one of the W control resource pools comprising a PDCCH triggering the target signal.

16. The method in a first node according to claim 14, wherein the X cell groups are indexed in order, and at least one of the first search space set or the first identifier is used to determine an index of a cell group to which the first serving cell belongs; the X bit subsets are concatenated to generate the first bit set, and an order of indexes of the X cell groups is used to determine a concatenation order of the X bit subsets.

17. The method in a first node according to claim 14, comprising:
receiving a second information block;

wherein the second information block is used to determine a first time-domain resource block, and the first time-domain resource set comprises more than one time-domain resource blocks; the first PDCCH is used to determine a target time-domain resource block, the target time-domain resource block belongs to a second time-domain resource set, and the second time-domain resource set comprises more than one time-domain resource blocks; whether there exist fully or partially overlapped time-domain resource blocks between the first time-domain resource set and the second time-domain resource set is used to determine the X cell groups.

18. The method in a first node according to claim 14, wherein a first bit subset is one of the X bit subsets, the first bit subset comprises a first bit block, the first bit block comprises at least one bit, and any bit comprised in the first bit block belongs to the first bit subset; the first bit block corresponds to a first time-domain occasion, the first time-domain occasion is a time-domain occasion comprised in a first occasion set, the first occasion set comprises at least one time-domain occasion, and a position of the first time-domain occasion in the first occasion set is used to determine the first bit block in the first bit subset.

19. The method in a first node according to claim 18, wherein the first occasion set is one of M occasion sets, and any of the M occasion sets comprises at least one time-domain occasion, M being a positive integer; when M is greater than 1, at least one of the first search space set or the first identifier is used to determine the first occasion set out of the M occasion sets.

20. The first node according to claim 14, comprising:
receiving a first signal; and
transmitting a third information block;
wherein the first PDCCH is used to determine time-frequency resources occupied by the first signal; the first identifier is used for a scrambling sequence of the first signal, the first signal belongs to the first serving cell, and one of the X bit subsets is used to indicate whether the first signal is correctly received; and the third information block is used to indicate that the first node supports X being greater than 1.

* * * * *